(12) United States Patent
Hooper et al.

(10) Patent No.: US 7,480,706 B1
(45) Date of Patent: Jan. 20, 2009

(54) MULTI-THREADED ROUND-ROBIN RECEIVE FOR FAST NETWORK PORT

(75) Inventors: Donald F. Hooper, Shrewsbury, MA (US); Matthew J. Adiletta, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 09/710,496

(22) Filed: Nov. 10, 2000

Related U.S. Application Data

(63) Continuation-in-part of application No. 09/475,614, filed on Dec. 30, 1999.

(51) Int. Cl.
*G06F 15/16* (2006.01)
*G06F 15/173* (2006.01)

(52) U.S. Cl. .............. 709/223; 709/230; 718/108; 370/469; 370/394

(58) Field of Classification Search .......... 709/213, 709/237, 107, 108, 217–224, 230; 710/52, 710/111; 370/395.41, 391, 394, 469; 718/108, 718/107, 104; 712/210; 713/726
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,623,001 A | 11/1971 | Kleist et al. | |
| 3,736,566 A | 5/1973 | Anderson et al. | |
| 3,792,441 A | 2/1974 | Wymore et al. | |
| 3,889,243 A | 6/1975 | Drimak | |
| 3,940,745 A | 2/1976 | Sajeva | |
| 4,016,548 A | 4/1977 | Law et al. | |
| 4,032,899 A | 6/1977 | Jenny et al. | |
| 4,075,691 A | 2/1978 | Davis et al. | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,658,351 A | 4/1987 | Teng | |
| 4,709,347 A | 11/1987 | Kirk | |
| 4,745,544 A | 5/1988 | Renner et al. | |
| 4,788,640 A | 11/1988 | Hansen | |
| 4,831,358 A | 5/1989 | Ferrio et al. | |
| 4,858,108 A | 8/1989 | Ogawa et al. | |
| 4,866,664 A | 9/1989 | Burkhardt, Jr. et al. | |
| 4,890,218 A * | 12/1989 | Bram ..................... | 712/210 |

(Continued)

FOREIGN PATENT DOCUMENTS

EP    0 379 709    8/1990

(Continued)

OTHER PUBLICATIONS

"Dictionary of Computer words", Revised Edition, 1995, Houghton Mifflin Company, p. 220.*

(Continued)

*Primary Examiner*—Haresh N Patel
(74) *Attorney, Agent, or Firm*—Fish & Richardson P.C.

(57) ABSTRACT

A method of processing network data in a network processor includes assigning a group of receive threads to process network data from a port. Each of the group of receive threads process network data in a round-robin fashion.

16 Claims, 16 Drawing Sheets

U.S. PATENT DOCUMENTS

| | | | |
|---|---|---|---|
| 4,890,222 A * | 12/1989 | Kirk ........................... 713/400 |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung et al. |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. |
| 5,475,856 A | 12/1995 | Kogge |
| 5,485,455 A | 1/1996 | Dobbins et al. |
| 5,515,296 A * | 5/1996 | Agarwal ..................... 709/204 |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A * | 12/1996 | Nishtala et al. ............. 711/143 |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gulledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A | 11/1997 | Templeton et al. |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A * | 7/1998 | Born ........................... 370/408 |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A * | 9/1998 | Watts et al. .................. 709/202 |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,828,881 A | 10/1998 | Wang |
| 5,828,901 A | 10/1998 | O'Toole et al. |
| 5,832,215 A | 11/1998 | Kato et al. |
| 5,835,755 A | 11/1998 | Stellwagen, Jr. |
| 5,838,988 A | 11/1998 | Panwar et al. |
| 5,850,399 A | 12/1998 | Ganmukhi et al. |
| 5,850,530 A | 12/1998 | Chen et al. |
| 5,854,922 A | 12/1998 | Gravenstein et al. |
| 5,857,188 A | 1/1999 | Douglas |
| 5,860,138 A | 1/1999 | Engebretsen et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A * | 4/1999 | Johnson ....................... 714/726 |
| 5,905,876 A | 5/1999 | Pawlowski et al. |
| 5,905,889 A | 5/1999 | Wilhelm, Jr. |
| 5,909,686 A * | 6/1999 | Muller et al. ............. 707/104.1 |
| 5,915,123 A | 6/1999 | Mirsky et al. |
| 5,918,235 A | 6/1999 | Kirshenbaum et al. |
| 5,933,627 A | 8/1999 | Parady |
| 5,937,187 A | 8/1999 | Kosche et al. |
| 5,938,736 A * | 8/1999 | Muller et al. ................ 709/243 |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A | 9/1999 | Moore et al. |
| 5,958,031 A | 9/1999 | Kim |
| 5,961,628 A | 10/1999 | Nguyen et al. |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |
| 6,047,002 A | 4/2000 | Hartmann et al. |
| 6,049,867 A | 4/2000 | Eickemeyer et al. |
| 6,058,168 A | 5/2000 | Braband |
| 6,061,710 A | 5/2000 | Eickemeyer et al. |
| 6,067,300 A * | 5/2000 | Baumert et al. ............. 370/413 |
| 6,067,585 A | 5/2000 | Hoang |
| 6,070,231 A | 5/2000 | Ottinger |
| 6,072,781 A | 6/2000 | Feeney et al. |

| | | | |
|---|---|---|---|
| 6,073,215 A | 6/2000 | Snyder | |
| 6,079,008 A | 6/2000 | Clery, III | |
| 6,085,215 A * | 7/2000 | Ramakrishnan et al. | 718/102 |
| 6,085,248 A | 7/2000 | Sambamurthy et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,104,700 A | 8/2000 | Haddock et al. | |
| 6,111,886 A | 8/2000 | Stewart | |
| 6,112,016 A | 8/2000 | MacWilliams et al. | |
| 6,122,251 A | 9/2000 | Shinohara | |
| 6,128,669 A | 10/2000 | Moriarty et al. | |
| 6,134,665 A | 10/2000 | Klein et al. | |
| 6,141,677 A * | 10/2000 | Hanif et al. | 718/100 |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,170,051 B1 | 1/2001 | Dowling | |
| 6,175,927 B1 | 1/2001 | Cromer et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,544 B1 | 4/2001 | Borkenhagen et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,243 B1 | 4/2001 | Ueda et al. | |
| 6,223,274 B1 | 4/2001 | Catthoor et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,269,391 B1 | 7/2001 | Gillespie | |
| 6,272,109 B1 | 8/2001 | Pei et al. | |
| 6,272,520 B1 | 8/2001 | Sharangpani et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,282,169 B1 * | 8/2001 | Kiremidjian | 370/220 |
| 6,286,083 B1 | 9/2001 | Chin et al. | |
| 6,289,011 B1 | 9/2001 | Seo et al. | |
| 6,295,600 B1 | 9/2001 | Parady | |
| 6,298,370 B1 | 10/2001 | Tang et al. | |
| 6,307,789 B1 | 10/2001 | Wolrich et al. | |
| 6,311,261 B1 | 10/2001 | Chamdani et al. | |
| 6,320,861 B1 | 11/2001 | Adam et al. | |
| 6,324,624 B1 | 11/2001 | Wolrich et al. | |
| 6,335,932 B2 * | 1/2002 | Kadambi et al. | 370/391 |
| 6,338,078 B1 | 1/2002 | Chang et al. | |
| 6,345,334 B1 | 2/2002 | Nakagawa et al. | |
| 6,347,344 B1 | 2/2002 | Baker et al. | |
| 6,349,331 B1 | 2/2002 | Andra et al. | |
| 6,356,962 B1 | 3/2002 | Kasper | |
| 6,359,911 B1 | 3/2002 | Movshovich et al. | |
| 6,360,262 B1 | 3/2002 | Guenthner et al. | |
| 6,360,277 B1 | 3/2002 | Ruckley et al. | |
| 6,366,998 B1 | 4/2002 | Mohamed | |
| 6,373,848 B1 | 4/2002 | Allison et al. | |
| 6,377,998 B2 | 4/2002 | Noll et al. | |
| 6,389,031 B1 | 5/2002 | Chao et al. | |
| 6,389,449 B1 | 5/2002 | Nemirovsky et al. | |
| 6,393,026 B1 | 5/2002 | Irwin | |
| 6,393,483 B1 | 5/2002 | Latif et al. | |
| 6,404,737 B1 | 6/2002 | Novick et al. | |
| 6,415,338 B1 | 7/2002 | Habot | |
| 6,418,488 B1 | 7/2002 | Chilton et al. | |
| 6,424,657 B1 | 7/2002 | Voit et al. | |
| 6,424,659 B2 * | 7/2002 | Viswanadham et al. | 370/469 |
| 6,426,940 B1 | 7/2002 | Seo et al. | |
| 6,426,943 B1 | 7/2002 | Spinney et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,132 B1 | 8/2002 | Vincent et al. | |
| 6,438,134 B1 | 8/2002 | Chow et al. | |
| 6,448,812 B1 | 9/2002 | Bacigalupo | |
| 6,453,404 B1 | 9/2002 | Bereznyi et al. | |
| 6,457,015 B1 | 9/2002 | Eastham | |
| 6,463,035 B1 | 10/2002 | Moore | |
| 6,463,072 B1 | 10/2002 | Wolrich et al. | |
| 6,463,480 B2 | 10/2002 | Kikuchi et al. | |
| 6,463,527 B1 | 10/2002 | Vishkin | |
| 6,466,898 B1 | 10/2002 | Chan | |
| 6,477,562 B2 * | 11/2002 | Nemirovsky et al. | 718/108 |
| 6,484,224 B1 | 11/2002 | Robins et al. | |
| 6,501,731 B1 | 12/2002 | Chong et al. | |
| 6,507,862 B1 | 1/2003 | Joy et al. | |
| 6,522,188 B1 | 2/2003 | Poole | |
| 6,526,451 B2 * | 2/2003 | Kasper | 709/250 |
| 6,526,452 B1 | 2/2003 | Petersen et al. | |
| 6,529,983 B1 | 3/2003 | Marshall et al. | |
| 6,532,509 B1 | 3/2003 | Wolrich et al. | |
| 6,535,878 B1 | 3/2003 | Guedalia et al. | |
| 6,552,826 B2 | 4/2003 | Adler et al. | |
| 6,553,406 B1 | 4/2003 | Berger et al. | |
| 6,560,667 B1 | 5/2003 | Wolrich et al. | |
| 6,570,850 B1 * | 5/2003 | Gutierrez et al. | 370/231 |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,604,125 B1 * | 8/2003 | Belkin | 718/104 |
| 6,606,704 B1 | 8/2003 | Adiletta et al. | |
| 6,625,654 B1 * | 9/2003 | Wolrich et al. | 709/230 |
| 6,628,668 B1 | 9/2003 | Hutzli et al. | |
| 6,629,147 B1 | 9/2003 | Grow | |
| 6,629,236 B1 * | 9/2003 | Aipperspach et al. | 712/228 |
| 6,631,422 B1 * | 10/2003 | Althaus et al. | 709/250 |
| 6,631,430 B1 | 10/2003 | Wolrich et al. | |
| 6,631,462 B1 | 10/2003 | Wolrich et al. | |
| 6,657,963 B1 | 12/2003 | Paquette et al. | |
| 6,658,551 B1 | 12/2003 | Berenbaum et al. | |
| 6,661,774 B1 | 12/2003 | Lauffenburger et al. | |
| 6,661,794 B1 * | 12/2003 | Wolrich et al. | 370/394 |
| 6,665,699 B1 | 12/2003 | Hunter et al. | |
| 6,665,755 B2 | 12/2003 | Modelski et al. | |
| 6,667,920 B2 | 12/2003 | Wolrich et al. | |
| 6,668,317 B1 * | 12/2003 | Bernstein et al. | 712/245 |
| 6,671,827 B2 | 12/2003 | Guilford et al. | |
| 6,675,190 B1 * | 1/2004 | Schabernack et al. | 718/102 |
| 6,675,192 B2 * | 1/2004 | Emer et al. | 718/107 |
| 6,678,746 B1 | 1/2004 | Russell et al. | |
| 6,680,933 B1 | 1/2004 | Cheesman et al. | |
| 6,681,300 B2 | 1/2004 | Wolrich et al. | |
| 6,684,326 B1 | 1/2004 | Cromer et al. | |
| 6,694,380 B1 | 2/2004 | Wolrich et al. | |
| 6,697,379 B1 | 2/2004 | Jacquet et al. | |
| 6,721,325 B1 | 4/2004 | Duckering et al. | |
| 6,724,767 B1 | 4/2004 | Chong et al. | |
| 6,728,845 B2 | 4/2004 | Adiletta | |
| 6,732,187 B1 | 5/2004 | Lougheed et al. | |
| 6,754,211 B1 | 6/2004 | Brown | |
| 6,754,222 B1 | 6/2004 | Joung et al. | |
| 6,768,717 B1 | 7/2004 | Reynolds et al. | |
| 6,775,284 B1 | 8/2004 | Calvignac et al. | |
| 6,792,488 B2 | 9/2004 | Wolrich et al. | |
| 6,798,744 B1 | 9/2004 | Loewen et al. | |
| 6,826,615 B2 | 11/2004 | Barrall et al. | |
| 6,834,053 B1 | 12/2004 | Stacey et al. | |
| 6,850,521 B1 | 2/2005 | Kadambi et al. | |
| 6,856,622 B1 | 2/2005 | Calamvokis et al. | |

| | | |
|---|---|---|
| 6,873,618 B1 | 3/2005 | Weaver |
| 6,876,561 B2 | 4/2005 | Wolrich et al. |
| 6,895,457 B2 | 5/2005 | Wolrich et al. |
| 6,925,637 B2* | 8/2005 | Thomas et al. ............... 717/151 |
| 6,931,641 B1* | 8/2005 | Davis et al. ................. 718/108 |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Wheeler et al. |
| 7,006,495 B2 | 2/2006 | Hooper |
| 7,065,569 B2 | 6/2006 | Teraslinna |
| 7,069,548 B2 | 6/2006 | Kushlis |
| 7,096,277 B2 | 8/2006 | Hooper |
| 7,100,102 B2 | 8/2006 | Hooper et al. |
| 7,111,072 B1 | 9/2006 | Matthews et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1 | 12/2006 | Bohringer et al. |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 7,305,500 B2 | 12/2007 | Adiletta et al. |
| 7,328,289 B2 | 2/2008 | Wolrich et al. |
| 7,352,769 B2 | 4/2008 | Hooper et al. |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 | 10/2002 | Knight et al. |
| 2002/0181194 A1 | 12/2002 | Ho et al. |
| 2003/0043803 A1 | 3/2003 | Hooper |
| 2003/0067934 A1 | 4/2003 | Hooper et al. |
| 2003/0086434 A1 | 5/2003 | Kloth |
| 2003/0105901 A1 | 6/2003 | Wolrich et al. |
| 2003/0105917 A1 | 6/2003 | Ostler et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman |
| 2003/0196012 A1 | 10/2003 | Wolrich et al. |
| 2003/0210574 A1 | 11/2003 | Wolrich et al. |
| 2003/0231635 A1 | 12/2003 | Kalkunte et al. |
| 2004/0039895 A1 | 2/2004 | Wolrich et al. |
| 2004/0052269 A1 | 3/2004 | Hooper et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0085901 A1 | 5/2004 | Hooper et al. |
| 2004/0098496 A1* | 5/2004 | Wolrich et al. ............... 709/230 |
| 2004/0109369 A1 | 6/2004 | Wolrich et al. |
| 2004/0148382 A1 | 7/2004 | Narad et al. |
| 2004/0162933 A1 | 8/2004 | Adiletta et al. |
| 2004/0252686 A1 | 12/2004 | Hooper et al. |
| 2005/0033884 A1 | 2/2005 | Wolrich et al. |
| 2005/0149665 A1 | 7/2005 | Wolrich et al. |
| 2006/0007871 A1 | 1/2006 | Welin |
| 2006/0069882 A1 | 3/2006 | Wheeler et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59-111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/030461 | 4/2003 |

OTHER PUBLICATIONS

Digital Semiconductor 21140A PCI Fast Ehternet LAN Controller, Hardware Reference Manual, Digital Equipment Corporation, Mar. 1998, pp. i-x, 1-1 through 1-5, 2-1 through 2-12, 3-1 through 3-38, 4-31 through 5-2, 6-1 through 6-24.*

News.Com, Aug. 26, 1999, Enterprise Hardware, pp. 1-5.*

Kemathat Vibhatavanijt, Simultaneous Multithreading-Based Routers, Aug. 2000, pp. 1-8.

Girish P. Chandranmenon et al, Trading Packet Headers for Packet Processing, IEEE/ACM Transactions on Networking, vol. 4, No. 2, Apr. 1996.

"10-/100-Mbps Ethernet Media Access Controller (MAC) Core", NEC, 1998, pp. 1-5, Dec. 31.

"The ATM Forum Technical Committee Traffic Management Specification Version 4.1", The ATM Forum (Mar. 1999).

Agarwal et al., "April: A Processor Architecture for Multiprocessing," Proceedings of the 17th Annual International Symposium on Computer Architecture, *IEEE*, pp. 104-114, (1990), Dec. 31.

Beckerle, M.J., "Overview of the Start (*T) multithreaded computer" (abstract only), Publication Date: Feb. 22-26, 1993.

Byrd et al., "Multithread Processor Architectures," *IEEE Spectrum*, 32(8):38-46, New York, Aug. 1995.

Chappell, et al., "Simultaneous Subordinate Microthreading (SSMT)", *IEEE*, pp. 186-195 (1999), Dec. 31.

*Dictionary of Computer Words: An A to Z Guide to Today's Computers, Revised Edition*, Houghton Mifflin Company: Boston, Massachusetts, pp. 220, (1995), Dec. 31.

Doyle et al., *Microsoft Press Computer Dictionary*, $2^{nd}$ ed., Microsoft Press, Redmond, Washington, USA, p. 326 (1994), Dec. 31.

Farrens, et al., "Strategies for Achieving Improved Processor Throughput", *ACM*, pp. 362-369 (1991), Dec. 31.

Fillo et al., "The M-Machine Multicomputer," *IEEE Proceedings of MICRO-28*, pp. 146-156, (1995).

Frazier, Howard, "Gigabit Ethernet: From 100 to 1,000 Mbps", *IEEE Internet Computing*, pp. 24-31, (1999), Dec. 31.

Frazier, Howard, "The 802.3z Gigabit Ethernet Standard", *IEEE Network*, pp. 6-7, (1998), Dec. 31.

Giroux, N., et al., "Queuing and Scheduling: Quality of Service in ATM Networks, Chapter 5", *Quality of Service in ATM Networks: State-of-the Art Traffic Management*, pp. 96-121 (1998), Dec. 31.

Gomez et al., "Efficient Multithreaded User-Space Transport for Network Computing: Design and Test of the TRAP Protocol," *Journal of Parallel and Distributed Computing*, Academic Press, Duluth, Minnesota, USA, 40(1):103-117, Jan. 1997.

Govind, et al., "Performance modeling and architecture exploration of network processors", *Quantitative Evaluation of Systems*, abstract only (1 page), Sep. 2005.

Haug et al., "Reconfigurable hardware as shared resource for parallel threads," *IEEE Symposium on FPGAs for Custom Computing Machines*, 2 pages, (1998), Dec. 31.

Hauser et al., "Garp: a MIPS processor with a reconfigurable coprocessor," *Proceedings of the 5th Annual IEEE Symposium on Field-Programmable Custom Computing Machines*, pp. 12-21, (1997), Dec. 31.

Hyde, R., "Overview of Memory Management," *Byte*, 13(4):219-225, (1988), Dec. 31.

Ippoliti, A., et al., "Parallel Media Access Controller for Packet Communications at Gb/s Rates", *IEEE*, pp. 991-996, (1990), Dec. 31.

Jenks, S., et al., "Nomadic Threads: A migrating multithread approach to remote memory accesses in multiprocessors" (abstract only), Publication Date: Oct. 20-23, 1996.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communication Networks: Fundamental Concepts and Key Architectures*, McGraw-Hill Higher Education, Copyright 2000, pp. 195-198, 215-219, & 380-385, Dec. 31.

Lim, A., et al., "Improving Performance of Adaptive Media Access Control Protocols for High-Density Wireless Networks", *Proceedings of the 1999 International Symposium on Parallel Architectures, Algorithms and Networks(ISPAN '99)*, pp. 316-321, Jun. 1999.

Litch et al., "StrongARMing Portable Communications," *IEEE Micro*, 18(2):48-55, Mar. 1998.

Mollenauer, J.F., et al., "An Efficient Media Access Control Protocol for Broadband Wireless Access Systems", *IEEE Standard, IEEE 802.16 Broadband Wireless Access Working Group*, 19 pages, Oct. 1999.

Ocheltree, K.B., et al., "A comparison of fibre channel and 802 MAC services", *Proceedings of 18th Conference on Local Computer Networks*, abstract only, 1 page, Sep. 1993.

Schmidt et al., "The Performance of Alternative Threading Architectures for Parallel Communication Subsystems," Internet Document, *Online!*, Nov. 13, 1998, pp. 1-19.

Shaw, M.C., et al., *UNIX Internals: A Systems Operations Handbook*, Windcrest Books, pp. 30-37, 1987, Dec. 31.

Thistle et al., "A Processor Architecture for Horizon," *IEEE Proc. Supercomputing '88*, pp. 35-41, Nov. 1988.

Todorova, P., et al., "Quality-of-Service-Oriented Media Access Control for Advanced Mobile Multimedia Satellite Systems", *Proceedings of the 36th Annual Hawaii International Conference on System Sciences (HICSS'03)*, 8 pages, Jan. 2003.

Tremblay et al., "A Three Dimensional Register File for Superscalar Processors," *IEEE Proceedings of the 28th Annual Hawaii International Conference on System Sciences*, pp. 191-201, (1995), Dec. 31.

Trimberger et al, "A time-multiplexed FPGA," *Proceedings of the 5th Annual IEEE Symposium on Field-Programmable Custom Computing Machines*, pp. 22-28, (1997).

Turner et al., "Design of a High Performance Active Router," Internet Document, *Online!*, 20 pages, Mar. 18, 1999.

Vuppala, V., et al., "Layer-3 switching using virtual network ports", *IEEE Proc. Computer Communications and Networks*, pp. 642-648, 1999, Dec. 31.

Wazlowski et al., "PRSIM-II computer and architecture," *IEEE Proceedings, Workshop on FPGAs for Custom Computing Machines*, pp. 9-16, (1993), Dec. 31.

Wikipedia entry, "Media Access Control", retrieved from http://en.wikipedia.org/wiki/Media_access_control, 2 pages, Jul. 31, 2007.

U.S. Appl. No. 09/473,571, filed Dec. 28, 1999, Wolrich et al.

U.S. Appl. No. 09/475,614, filed Dec. 30, 1999, Wolrich et al.

* cited by examiner

FIG. 10A

| | 230a | 230b | 230c | 230d | 230e | 230f | 230g | 230h | 230i | 230j | 230k | 230l | 230m |
|---|---|---|---|---|---|---|---|---|---|---|---|---|---|
| 0 | RES | FA | | SL | E2 | E1 | FS | NFE | IG FR | SIGRS | TID | RM | RP |
| 1 | | | | | | | | | | | | | |

| | 232a | 232b | 232c | 232d | 232e | 232f | 232g | 232h | 232i | 232j | 232k | 232l |
|---|---|---|---|---|---|---|---|---|---|---|---|---|
| 0 | THMSG | MACPORT/ THD | SOP_ SEQ# | RF | RERR | SE | FE | EFOR | SNOR | VALID BYTES | EOP | SOP |
| 1 | | | | | | | | | | | | |
| 2 | | | | | | | | | | | | |
| 3 | | | | | | | | | | | | |

(233, 233, 233, 233)

MULTI-THREADED ROUND-ROBIN RECEIVE FOR FAST NETWORK PORT

RELATED APPLICATIONS

This application is a continuation-in-part of U.S. patent application Ser. No. 09/475,614 filed Dec. 30, 1999, now copending application.

BACKGROUND OF THE INVENTION

1. Field of the Invention

The described invention relates to the field of network communications. In particular, the invention relates to a method for using multiple threads to process incoming network data.

2. Description of Related Art

Networking products such as routers require high speed components for packet data movement, i.e., collecting packet data from incoming network device ports and queuing the packet data for transfer to appropriate forwarding device ports. They also require high-speed special controllers for processing the packet data, that is, parsing the data and making forwarding decisions. Because the implementation of these high-speed functions usually involves the development of ASIC or custom devices, such networking products are of limited flexibility. For example, each controller is assigned to service network packets from one or more given ports on a permanent basis.

BRIEF DESCRIPTION OF THE DRAWINGS

FIGS. 10A and 10B are illustrations of the format of the RCV_REQ FIFO and the RCV_CTL FIFO, respectively.

DETAILED DESCRIPTION

A method of using multiple receive threads to receive data in a round robin scheme is disclosed. First, one embodiment of the hardware that enables the multiple thread system is described. Then the method of employing the multiple threads in a round robin fashion is described.

Figure 1:
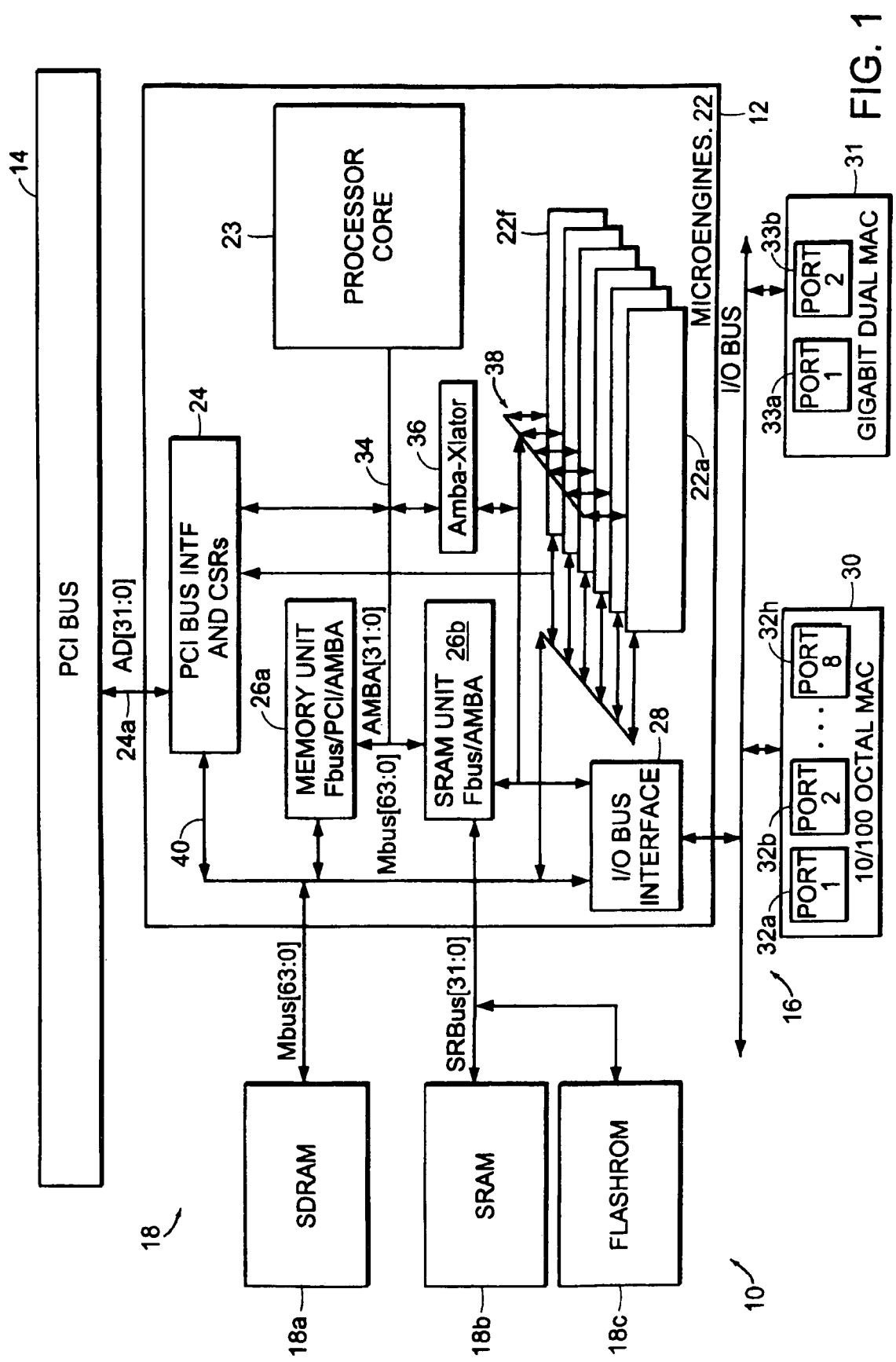
FIG. 1 is a block diagram of a communication system employing a hardware-based multi-threaded processor.
Figure 2:
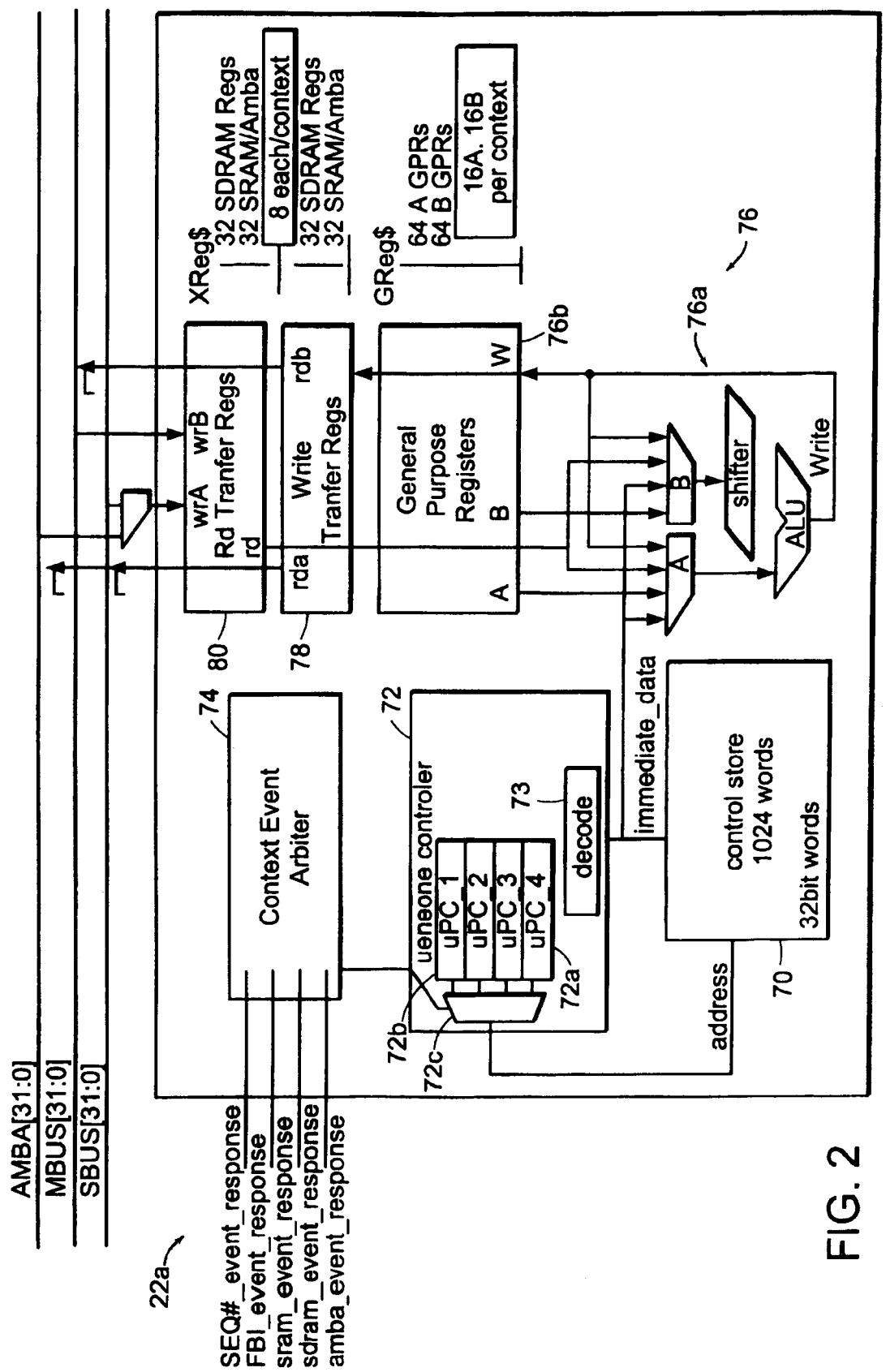
FIG. 2 is a block diagram of a microengine employed in the hardware-based multi-threaded processor of FIG. 1.

Referring to FIG. 1, a communication system 10 includes a parallel, hardware-based multi-threaded processor 12. The hardware based multi-threaded processor 12 is coupled to a first peripheral bus (shown as a PCI bus) 14, a second peripheral bus referred to as an I/O bus 16 and a memory system 18. The system 10 is especially useful for tasks that can be broken into parallel subtasks or functions. The hardware-based multi-threaded processor 12 includes multiple microengines 22, each with multiple hardware controlled program threads that can be simultaneously active and independently work on a task. In the embodiment shown, there are six microengines 22a-22f and each of the six microengines is capable of processing four program threads, as will be described more fully below.

The hardware-based multi-threaded processor 12 also includes a processor 23 that assists in loading microcode control for other resources of the hardware-based multi-threaded processor 12 and performs other general purpose computer type functions such as handling protocols, exceptions, extra support for packet processing where the microengines pass the packets off for more detailed processing. In one embodiment, the processor 23 is a StrongARM (ARM is a trademark of ARM Limited, United Kingdom) core based architecture. The processor (or core) 23 has an operating system through which the processor 23 can call functions to operate on the microengines 22a-22f. The processor 23 can use any supported operating system, preferably real-time operating system. For the core processor implemented as a StrongARM architecture, operating systems such as MicrosoftNT real-time, VXWorks and :CUS, a freeware operating system available over the Internet, can be used.

The six microengines 22a-22f each operate with shared resources including the memory system 18, a PCI bus interface 24 and an I/O bus interface 28. The PCI bus interface provides an interface to the PCI bus 14. The I/O bus interface 28 is responsible for controlling and interfacing the processor 12 to the I/O bus 16. The memory system 18 includes a Synchronous Dynamic Random Access Memory (SDRAM) 18a, which is accessed via an SDRAM controller 26a, a Static Random Access Memory (SRAM) 18b, which is accessed using an SRAM controller 26b, and a nonvolatile memory (shown as a FlashROM) 18c that is used for boot operations. The SDRAM 16a and SDRAM controller 26a are typically used for processing large volumes of data, e.g., processing of payloads from network packets. The SRAM 18b and SRAM controller 26b are used in a networking implementation for low latency, fast access tasks, e.g., accessing look-up tables, memory for the processor 23, and so forth. The microengines 22a-22f can execute memory reference instructions to either the SDRAM controller 26a or the SRAM controller 18b.

The hardware-based multi-threaded processor 12 interfaces to network devices such as a media access controller ("MAC") device, including a "slow" device 30 (e.g., 10/100BaseT Ethernet MAC) and/or a "fast" device 31, such as Gigabit Ethernet MAC, ATM device or the like, over the I/O Bus 16. In the embodiment shown, the slow device 30 is an 10/100 BaseT Octal MAC device and thus includes 8 slow ports 32a-32h, and the fast device is a Dual Gigabit MAC device having two fast ports 33a, 33b. Each of the network devices attached to the I/O Bus 16 can include a plurality of ports to be serviced by the processor 12. Other devices, such as a host computer (not shown), that may be coupled to the PCI bus 14 are also serviced by the processor 12. In general, as a network processor, the processor 12 can interface to any type of communication device or interface that receives/sends large amounts of data. The processor 12 functioning as a network processor could receive units of packet data from the devices 30, 31 and process those units of packet data in a parallel manner, as will be described. The unit of packet data could include an entire network packet (e.g., Ethernet packet) or a portion of such a packet.

Each of the functional units of the processor 12 are coupled to one or more internal buses. The internal buses include an internal core bus 34 (labeled "AMBA") for coupling the processor 23 to the memory controllers 26a, 26b and to an AMBA translator 36. The processor 12 also includes a private bus 38 that couples the microengines 22a-22f to the SRAM controller 26b, AMBA translator 36 and the Fbus interface 28. A memory bus 40 couples the memory controllers 26a, 26b to the bus interfaces 24, 28 and the memory system 18.

Figure 3:
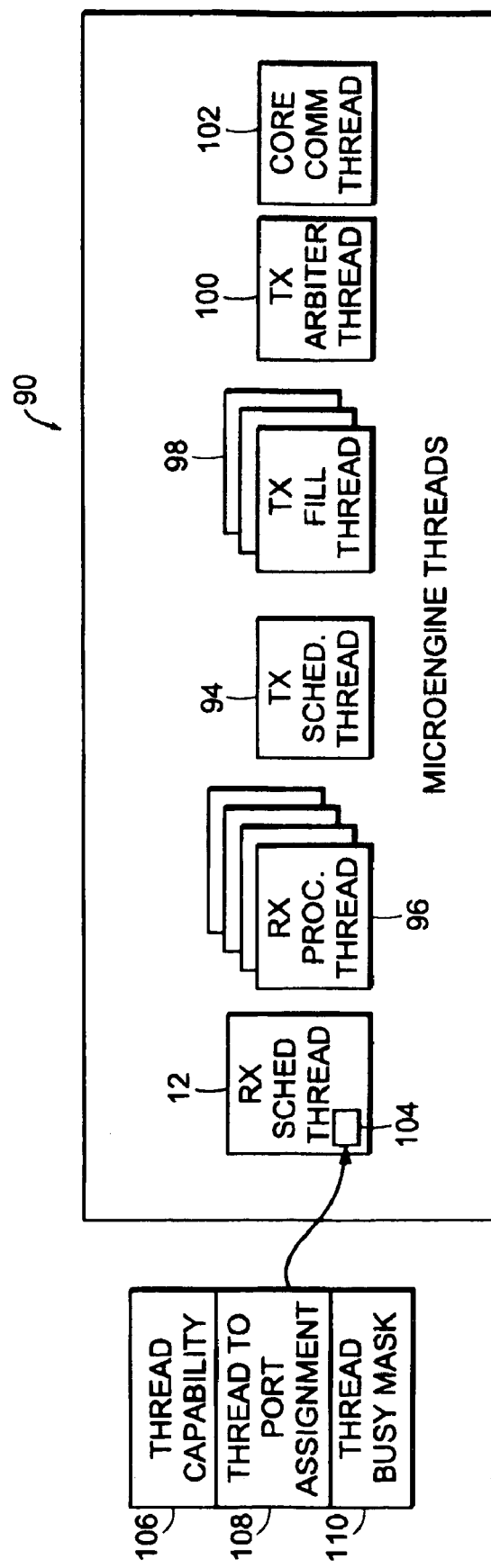
FIG. 3 is an illustration of an exemplary thread task assignment.

Referring to FIG. 3, an exemplary one of the microengines 22a-22f is shown. The microengine 22a includes a control store 70 for storing a microprogram. The microprogram is loadable by the central processor 20. The microengine 70 also includes control logic 72. The control logic 72 includes an instruction decoder 73 and program counter units 72a-72d. The four program counters are maintained in hardware. The microengine 22a also includes context event switching logic 74. The context event switching logic 74 receives messages (e.g., SEQ_#_EVENT_RESPONSE; FBI_EVENT_RESPONSE; SRAM_EVENT_RESPONSE; SDRAM_EVENT_ RESPONSE; and AMBA_EVENT_RESPONSE) from each one of the share resources, e.g., SRAM 26b, SDRAM 26a, or processor core 20, control and status registers, and so forth. These messages provides information on whether a requested function has completed. Based on whether or not the function requested by a thread has completed and signaled completion, the thread needs to wait for that complete signal, and if the thread is enabled to operate, then the thread is placed on an available thread list (not shown). As earlier mentioned, in one embodiment, the microengine 22a can have a maximum of four threads of execution available.

In addition to event signals that are local to an executing thread, the microengine employs signaling states that are global. With signaling states, an executing thread can broadcast a signal state to all microengines 22. Any and all threads in the microengines can branch on these signaling states. These signaling states can be used to determine availability of a resource or whether a resource is due for servicing.

The context event logic 74 has arbitration for the four threads. In one embodiment, the arbitration is a round robin mechanism. However, other arbitration techniques, such as priority queuing or weighted fair queuing, could be used. The microengine 22a also includes an execution box (EBOX) data path 76 that includes an arithmetic logic unit (ALU) 76a and a general purpose register (GPR) set 76b. The ALU 76a performs arithmetic and logical functions as well as shift functions.

The microengine 22a further includes a write transfer register file 78 and a read transfer register file 80. The write transfer register file 78 stores data to be written to a resource. The read transfer register file 80 is for storing return data from a resource. Subsequent to or concurrent with the data arrival, an event signal from the respective shared resource, e.g., memory controllers 26a, 26b, or core 23, will be provided to the context event arbiter 74, which in turn alerts the thread that the data is available or has been sent. Both transfer register files 78, 80 are connected to the EBOX 76 through a data path. In the described implementation, each of the register files includes 64 registers.

The functionality of the microengine threads is determined by microcode loaded (via the core processor) for a particular user's application into each microengine's control store 70. Referring to FIG. 3, an exemplary thread task assignment 90 is shown. Typically, one of the microengine threads is assigned to serve as a receive scheduler 92 and another as a transmit scheduler 94. A plurality of threads are configured as receive processing threads 96 and transmit processing (or "fill") threads 98. Other thread task assignments include a transmit arbiter 100 and one or more core communication threads 102. Once launched, a thread performs its function independently.

The receive scheduler thread 92 assigns packets to receive processing threads 96. In a packet forwarding application for a bridge/router, for example, the receive processing thread parses packet headers and performs lookups based in the packet header information. Once the receive processing thread or threads 96 has processed the packet, it either sends the packet as an exception to be further processed by the core 23 (e.g., the forwarding information cannot be located in lookup and the core processor must learn it), or stores the packet in the SDRAM and queues the packet in a transmit queue by placing a packet link descriptor for it in a transmit queue associated with the transmit (forwarding port) indicated by the header/lookup. The transmit queue is stored in the SRAM. The transmit arbiter thread 100 prioritizes the transmit queues and the transmit scheduler thread 94 assigns packets to transmit processing threads that send the packet out onto the forwarding port indicated by the header/lookup information during the receive processing.

The receive processing threads 96 may be dedicated to servicing particular ports or may be assigned to ports dynamically by the receive scheduler thread 92. For certain system configurations, a dedicated assignment may be desirable. For example, if the number of ports is equal to the number of receive processing threads 96, then it may be quite practical as well as efficient to assign the receive processing threads to ports in a one-to-one, dedicated assignment. In other system configurations, a dynamic assignment may provide a more efficient use of system resources.

The receive scheduler thread 92 maintains scheduling information 104 in the GPRs 76b of the microengine within which it executes. The scheduling information 104 includes thread capabilities information 106, port-to-thread assignments (list) 108 and "thread busy" tracking information 110. At minimum, the thread capabilities information informs the receive scheduler thread as to the type of tasks for which the other threads are configured, e.g., which threads serve as receive processing threads. Additionally, it may inform the receive scheduler of other capabilities that may be appropriate to the servicing of a particular port. For instance, a receive processing thread may be configured to support a certain protocol, or a particular port or ports. A current list of the ports to which active receive processing threads have been assigned by the receive scheduler thread is maintained in the thread-to-port assignments list 108. The thread busy mask register 110 indicates which threads are actively servicing a port. The receive scheduler uses all of this scheduling information in selecting threads to be assigned to ports that require service for available packet data, as will be described in further detail below.

Figure 4:
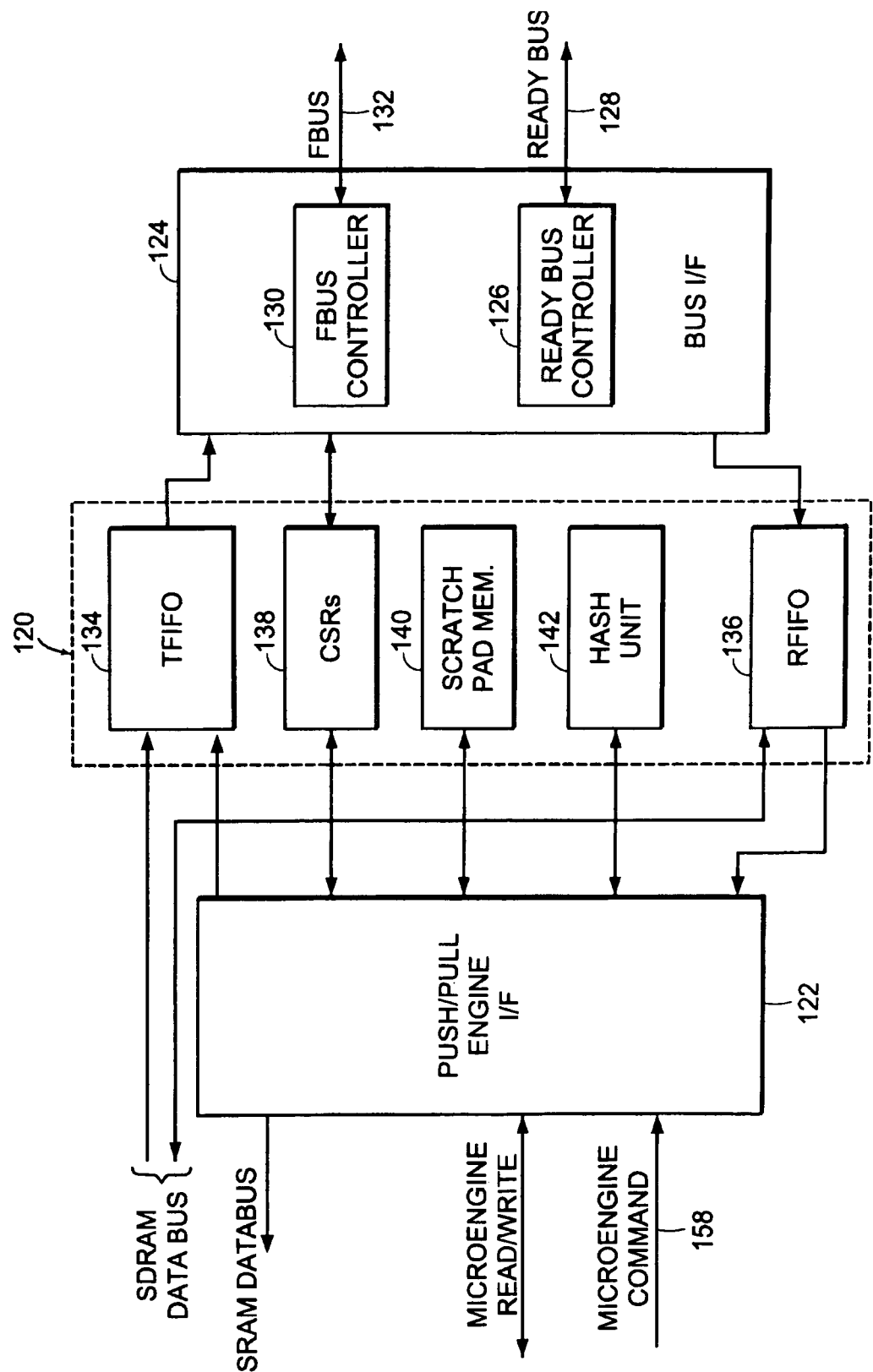
FIG. 4 is a block diagram of an I/O bus interface shown in FIG. 1.

Referring to FIG. 4, the I/O bus interface 28 includes shared resources 120, which are coupled to a push/pull engine interface 122 and a bus interface unit 124. The bus interface unit 124 includes a ready bus controller 126 connected to a ready bus 128 and an Fbus controller 130 for connecting to a portion of the I/O bus referred to as an Fbus 132. Collectively, the ready bus 128 and the Fbus 132 make up the signals of the I/O bus 16 (FIG. 1). The resources 120 include two FIFOs, a transmit FIFO 134 and a receive FIFO 136, as well as CSRs 138, a scratchpad memory 140 and a hash unit 142. The Fbus 132 transfers data between the ports of the devices 30, 31 and the I/O bus interface 28. The ready bus 128 is an 8-bit bus that performs several functions. It is used to read control information about data availability from the devices 30, 31, e.g., in the form of ready status flags. It also provides flow control information to the devices 30, 31, and may be used to communicate with another network processor 12 that is connected to the Fbus 132. Both buses 128, 132 are accessed by the microengines 22 through the CSRs 138. The CSRs 138 are used for bus configuration, for accessing the bus interface unit 124, and for inter-thread signaling. They also include several counters and thread status registers, as will be described. The CSRs 138 are accessed by the microengines 22 and the core 23. The receive FIFO (RFIFO) 136 includes data buffers for holding data received from the Fbus 132 and is read by the microengines 22. The transmit FIFO (TFIFO) 134 includes data buffers that hold data to be transmitted to the Fbus 132 and is written by the microengines 22. The scatchpad memory 140 is accessed by the core 23 and microengines 22, and supports a variety of operations, including read and write operations, as well as bit test, bit test/clear and increment operations. The hash unit 142 generates hash indexes for 48-bit or 64-bit data and is accessed by the microengines 22 during lookup operations.

The processors 23 and 22 issue commands to the push/pull engine interface 122 when accessing one of the resources 120. The push/pull engine interface 122 places the commands into queues (not shown), arbitrates which commands to service, and moves data between the resources 120, the core 23 and the microengines 22. In addition to servicing requests from the core 23 and microengines 22, the push/pull engines 122 also service requests from the ready bus 128 to transfer control information to a register in the microengine read transfer registers 80.

When a thread issues a request to a resource 120, a command is driven onto an internal command bus 150 and placed in queues within the push/pull engine interface 122. Receive/read-related instructions (such as instructions for reading the CSRs) are written to a "push" command queue.

The CSRs 138 include the following types of registers: Fbus receive and transmit registers; Fbus and ready bus configuration registers; ready bus control registers; hash unit configuration registers; interrupt registers; and several miscellaneous registers, including a thread status registers. Those of the registers which pertain to the receive process will be described in further detail.

The interrupt/signal registers include an INTER_THD_SIG register for inter-thread signaling. Any thread within the microengines 22 or the core 23 can write a thread number to this register to signal an inter-thread event.

Figure 5:
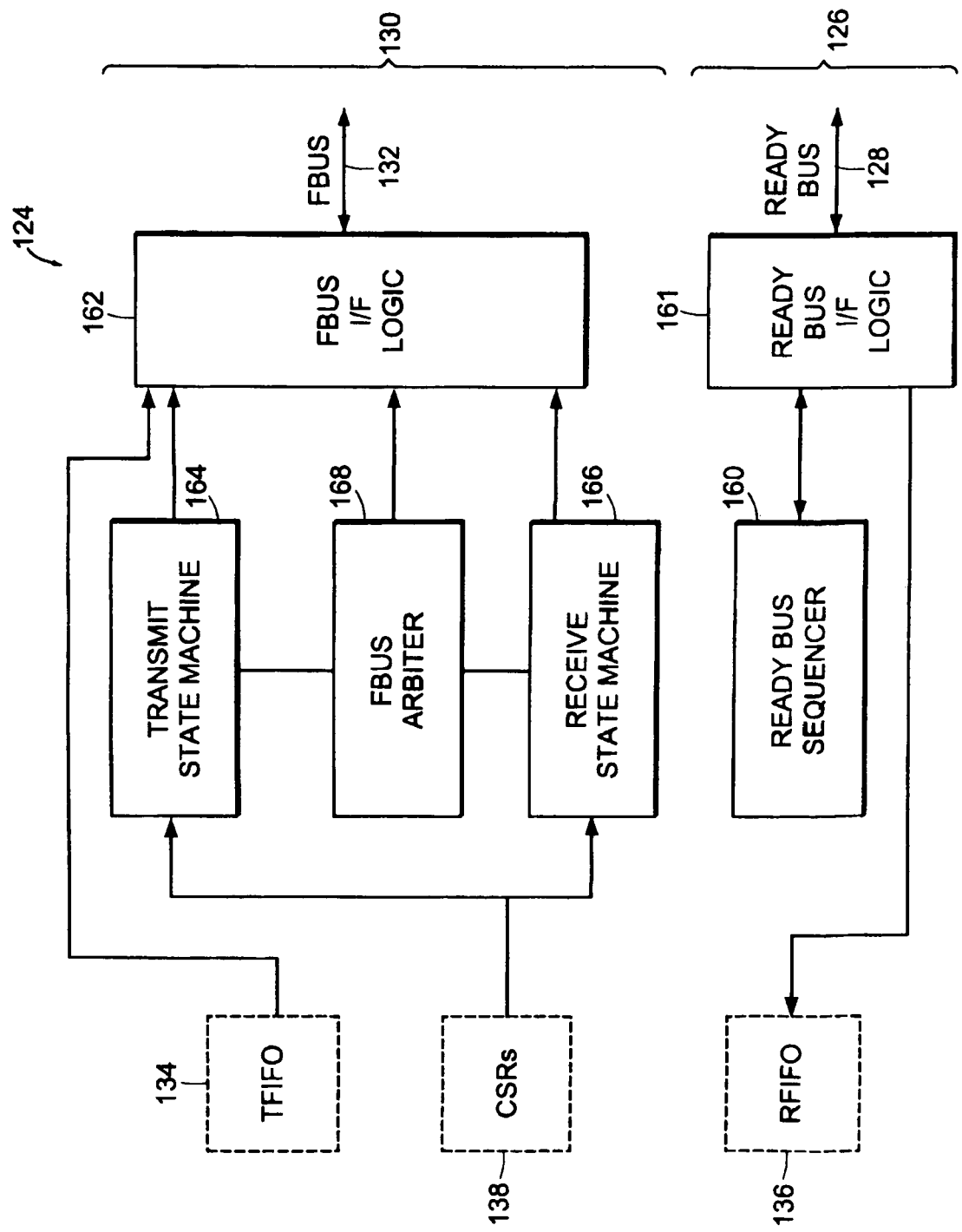
FIG. 5 is a detailed diagram of a bus interface unit employed by the I/O bus interface of FIG. 4.

Further details of the Fbus controller 130 and the ready bus controller 126 are shown in FIG. 5. The ready bus controller 126 includes a programmable sequencer 160 for retrieving MAC device status information from the MAC devices 30, 31, and asserting flow control to the MAC devices over the ready bus 128 via ready bus interface logic 161. The Fbus controller 130 includes Fbus interface logic 162, which is used to transfer data to and from the devices 30, 31, is controlled by a transmit state machine (TSM) 164 and a receive state machine (RSM) 166. In the embodiment herein, the Fbus 132 may be configured as a bidirectional 64-bit bus, or two dedicated 32-bit buses. In the unidirectional, 32-bit configuration, each of the state machines owns its own 32-bit bus. In the bidirectional configuration, the ownership of the bus is established through arbitration. Accordingly, the Fbus controller 130 further includes a bus arbiter 168 for selecting which state machine owns the Fbus 132.

Figure 6A:
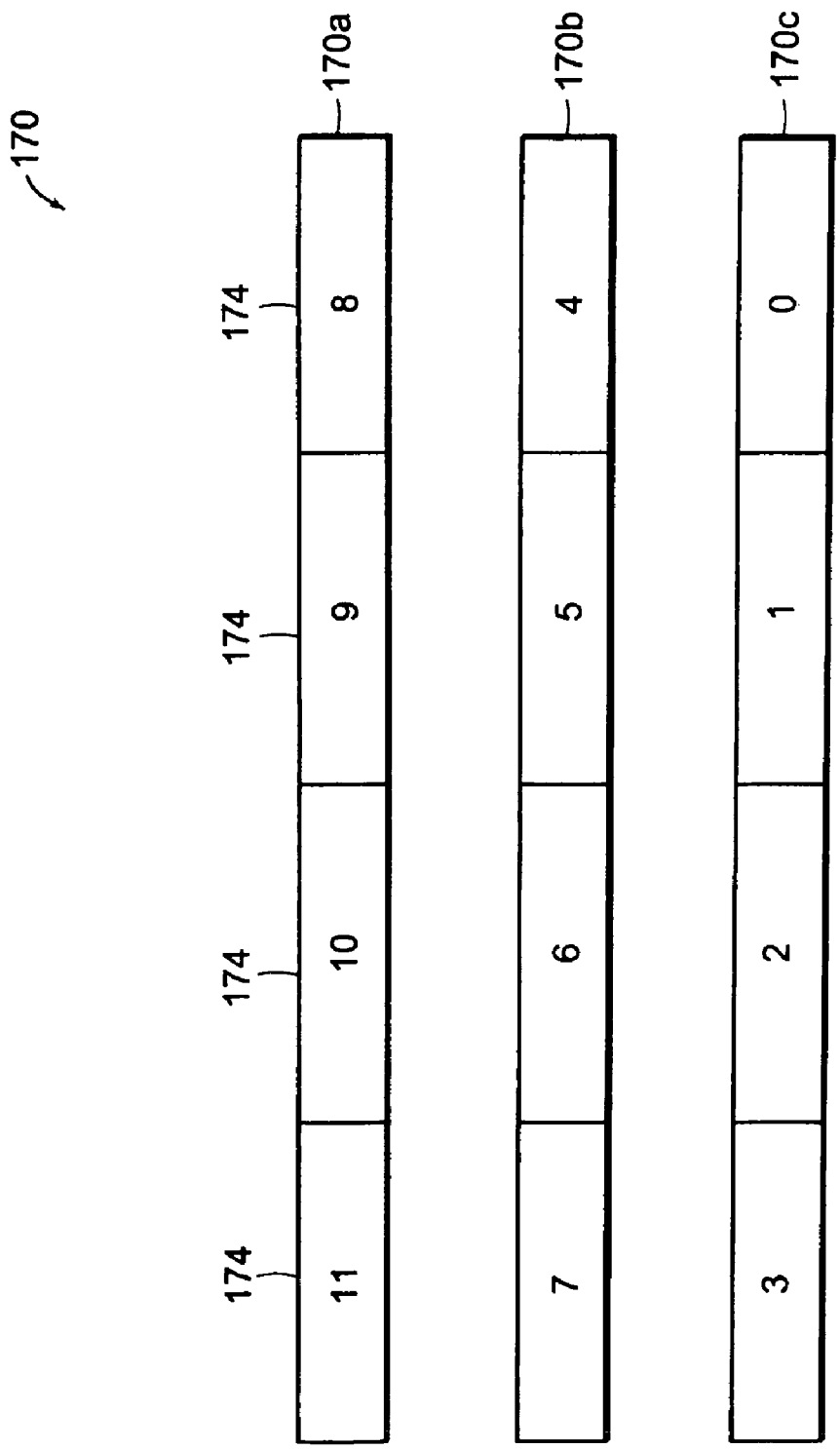
FIGS. 6A-6F are illustrations of various bus configuration control and status registers (CSRs).
Figure 6B:
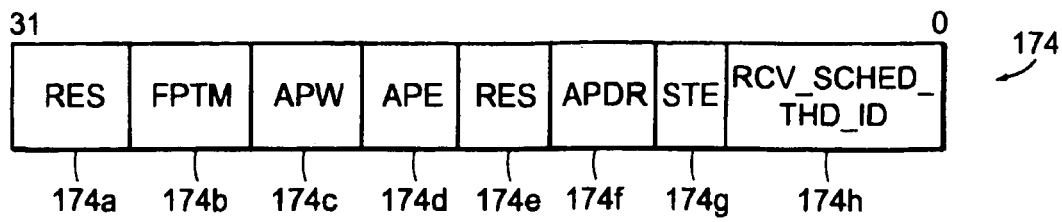

Some of the relevant CSRsu used to program and control the ready bus 128 and Fbus 132 for receive processes are shown in FIGS. 6A-6F. Referring to FIG. 6A, RDYBUS_TEMPLATE_PROGx registers 170 are used to store instructions for the ready bus sequencer. Each register of these 32-bit registers 170*a*, 170*b*, 170*c*, includes four, 8-bit instruction fields 172. Referring to FIG. 6B, a RCV_RDY_CTL register 174 specifies the behavior of the receive state machine 166. The format is as follows: a reserved field (bits 31:15) 174*a*; a fast port mode field (bits 14:13) 174*b*, which specifies the fast (Gigabit) port thread mode, as will be described; an auto push prevent window field (bits 12:10) 174*c* for specifying the autopush prevent window used by the ready bus sequencer to prevent the receive scheduler from accessing its read transfer registers when an autopush operation (which pushes information to those registers) is about to begin; an autopush enable (bit 9) 174*d*, used to enable autopush of the receive ready flags; another reserved field (bit 8) 174*e*; an autopush destination field (bits 7:6) 174*f* for specifying an autopush operation's destination register; a signal thread enable field (bit 5) 174*g* which, when set, indicates the thread to be signaled after an autopush operation; and a receive scheduler thread ID (bits 4:0) 174*h*, which specifies the ID of the microengine thread that has been configured as a receive scheduler.

Figure 6C:
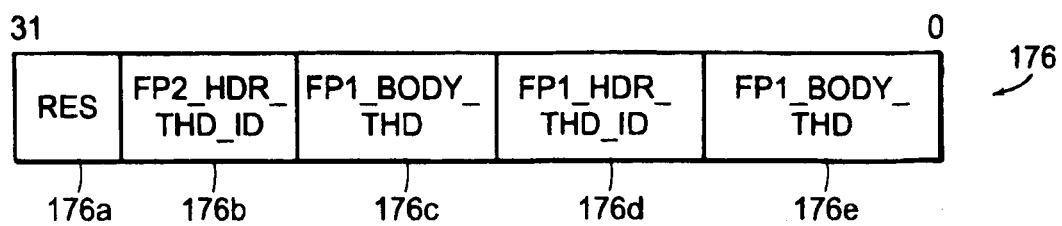
Figure 6D:
Figure 6E:
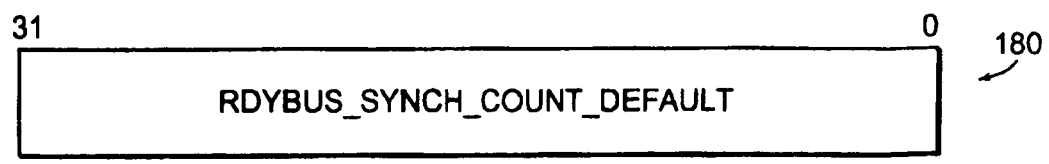
Figure 6F:

Referring to FIG. 6C, a REC_FASTPORT_CTL register 176 is relevant to receiving packet data from fast ports (fast port mode) only. It enables receive threads to view the current assignment of header and body thread assignments for the two fast ports, as will be described. It includes the following fields: a reserved field (bits 31:20) 176*a*; an FP2_HDR_THD_ID field (bits 19:15) 176*b*, which specifies the fast port 2 header receive (processing) thread ID; an FP2_BODY_THD_ID field (bits 14:10) 176*c* for specifying the fast port 2 body receive processing thread ID; an FP1_HDR_THD_ID field (bits 9:5) 176*d* for specifying the fast port 1 header receive processing thread ID; and an FP1_BODY_THD_ID field (bits 4:0) 176*e* for specifying the fast port 1 body processing thread ID. The manner in which these fields are used by the RSM 166 will be described in detail later.

Although not depicted in detail, other bus registers include the following: a RDYBUS_TEMPLATE_CTL register 178 (FIG. 6D), which maintains the control information for the ready bus and the Fbus controllers, for example, it enables the ready bus sequencer; a RDYBUS_SYNCH_COUNT_DEFAULT register 180 (FIG. 6E), which specifies the program cycle rate of the ready bus sequencer; and an FP_FASTPORT_CTL register 182 (FIG. 6F), which specifies how many Fbus clock cycles the RSM 166 must wait between the last data transfer and the next sampling of fast receive status, as will be described.

Figure 7A:
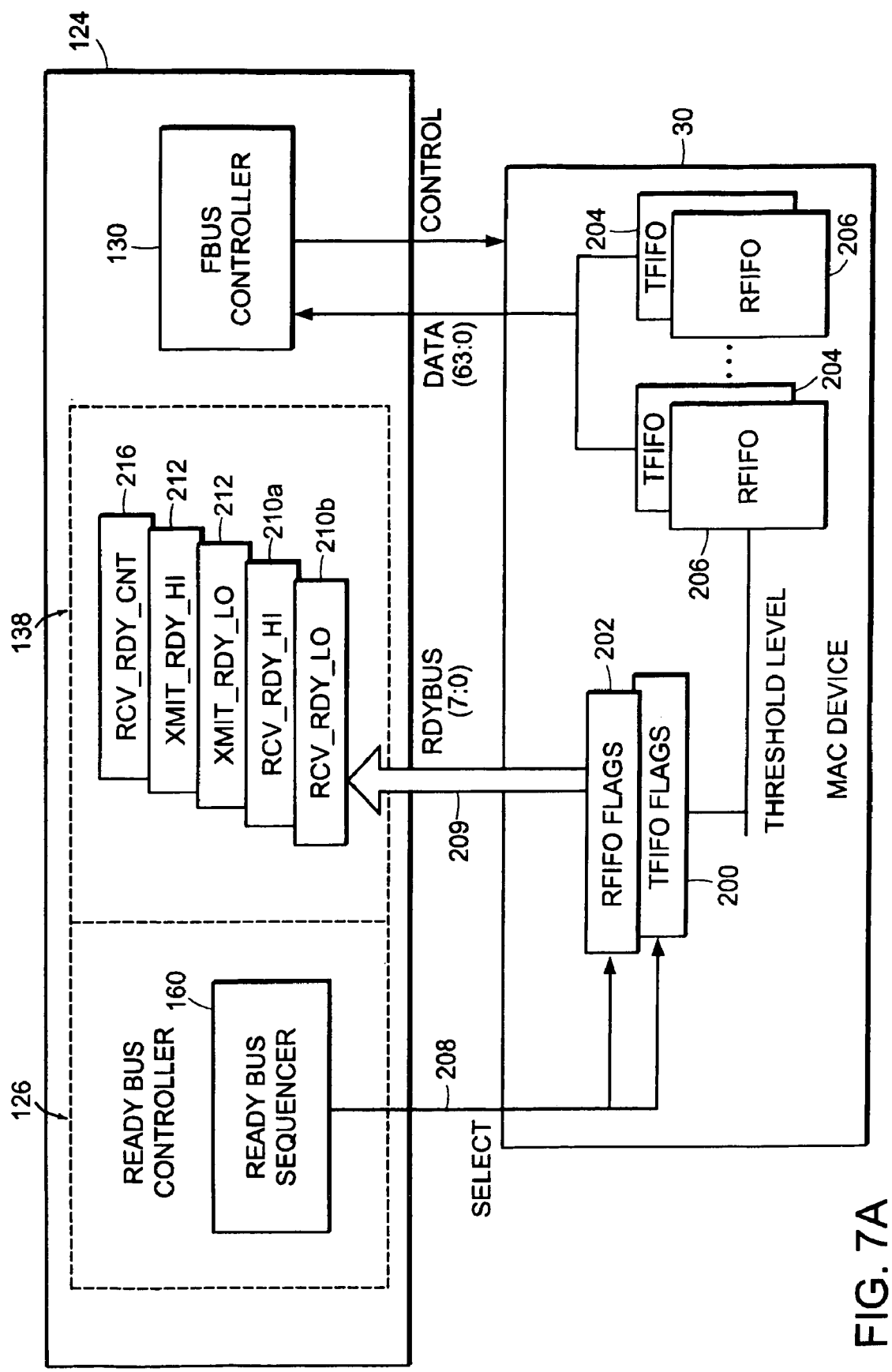
FIG. 7A is a detailed diagram illustrating the interconnection between a plurality of 10/100 Ethernet ("slow") ports and the bus interface unit.

Referring to FIG. 7A, the MAC device 30 provides transmit status flags 200 and receive status flags 202 that indicate whether the amount of data in an associated transmit FIFO 204 or receive FIFO 206 has reached a certain threshold level. The ready bus sequencer 160 periodically polls the ready flags (after selecting either the receive ready flags 202 or the transmit ready flags 200 via a flag select 208) and places them into appropriate ones of the CSRs 138 by transferring the flag data over ready bus data lines 209. In this embodiment, the ready bus includes 8 data lines for transferring flag data from each port to the Fbus interface unit 124. The CSRs in which the flag data are written are defined as RCV_RDY_HI/LO registers 210 for receive ready flags and XMIT_RDY_HI/LO registers 212 for transmit ready flags, if the ready bus sequencer 160 is programmed to execute receive and transmit ready flag read instructions, respectively.

When the ready bus sequencer is programmed with an appropriate instruction directing it to interrogate MAC receive ready flags, it reads the receive ready flags from the MAC device or devices specified in the instruction and places the flags into RCV_RDY_HI register 210a and a RCV_RDY_LO register 210b, collectively, RCV_RDY registers 210. Each bit in these registers corresponds to a different device port on the I/O bus.

Figure 7B:
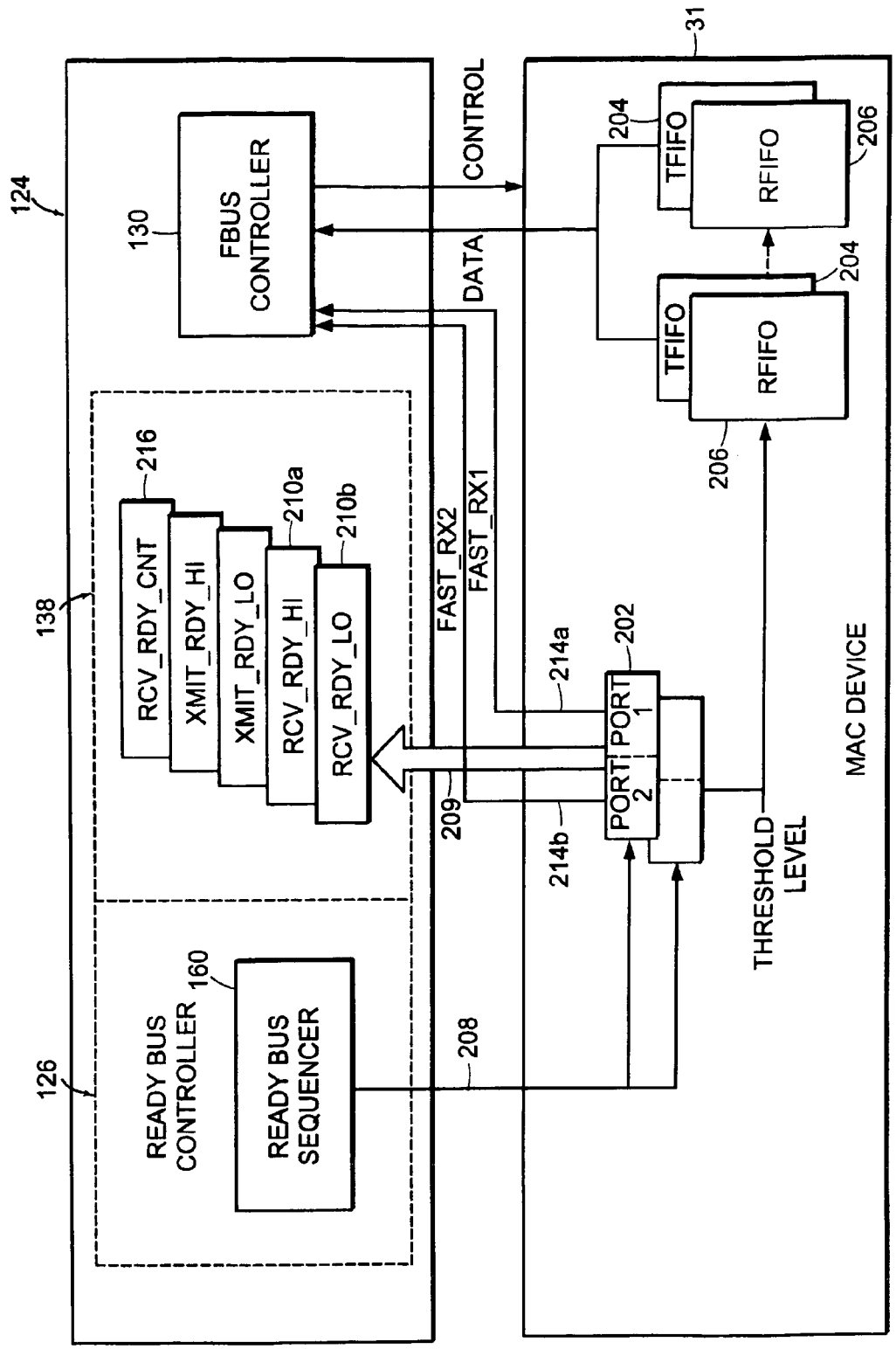
FIG. 7B is a detailed diagram illustrating the interconnection between two Gigabit Ethernet ("fast") ports and the bus interface unit.

Also, and as shown in FIG. 7B, the bus interface unit 124 also supports two fast port receive ready flag pins FAST_RX1 214a and FAST_RX2 214b for the two fast ports of the fast MAC device 31. These fast port receive ready flag pins are read by the RSM 166 directly and placed into an RCV_RDY_CNT register 216.

The RCV_RDY_CNT register 216 is one of several used by the receive scheduler to determine how to issue a receive request. It also indicates whether a flow control request is issued.

Figure 8A:
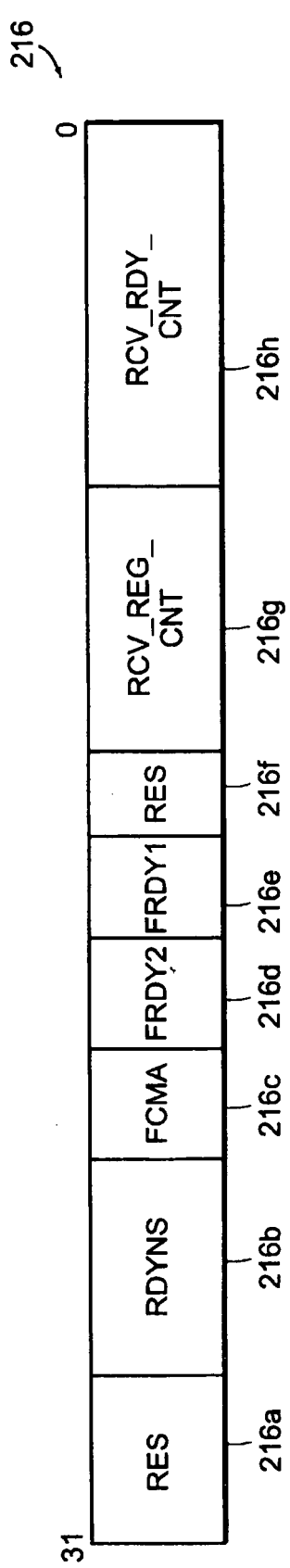
FIGS. 8A-8C are illustrations of the formats of the RCV_RDY_CTL, RCV_RDY_HI and RCV_RDY_LO CSR registers, respectively.

Referring to FIG. 8A, the format of the RCV_RDY_CNT register 216 is as follows: bits 31:28 are defined as a reserved field 216a; bit 27 is defined as a ready bus master field 216b and is used to indicate whether the ready bus 128 is configured as a master or slave; a field corresponding to bit 26 216c provides flow control information; bits 25 and 24 correspond to FRDY2 field 216d and FRDY1 field 216e, respectively. The FRDY2 216d and FRDY1 216e are used to store the values of the FAST_RX2 pin 214b and FAST_RX1 pin 214a, respectively, both of which are sampled by the RSM 166 each Fbus clock cycle; bits 23:16 correspond to a reserved field 216f; a receive request count field (bits 15:8) 216g specifies a receive request count, which is incremented after the RSM 166 completes a receive request and data is available in the RFIFO 136; a receive ready count field (bits 7:0) 216h specifies a receive ready count, an 8-bit counter that is incremented each time the ready bus sequencer 160 writes the ready bus registers RCV_RDY_CNT register 216, the RCV_RDY_LO register 210b and RCV_RDY_HI register 210a to the receive scheduler read transfer registers.

There are two techniques for reading the ready bus registers: "autopush" and polling. The autopush instruction may be executed by the ready bus sequencer 160 during a receive process (rxautopush) or a transmit process (txautopush). Polling requires that a microengine thread periodically issue read references to the I/O bus interface 28.

The rxautopush operation performs several functions. It increments the receive ready count in the RCV_RDY_CNT register 216. If enabled by the RCV_RDY_CTL register 174, it automatically writes the RCV_RDY_CNT 216, the RCV_RDY_LO and RCV_RDY_HI registers 210b, 210a to the receive scheduler read transfer registers and signals to the receive scheduler thread 92 (via a context event signal) when the rxautopush operation is complete.

The ready bus sequencer 160 polls the MAC FIFO status flags periodically and asynchronously to other events occurring in the processor 12. Ideally, the rate at which the MAC FIFO ready flags are polled is greater than the maximum rate at which the data is arriving at the MAC ports. Thus, it is necessary for the receive scheduler thread 92 to determine whether the MAC FIFO ready flags read by the ready bus sequencer 160 are new, or whether they have been read already. The rxautopush instruction increments the receive ready count in the RCV_RDY_CNT register 216 each time the instruction executes. The RCV_RDY_CNT register 216 can be used by the receive scheduler thread 92 to determine whether the state of specific flags have to be evaluated or whether they can be ignored because receive requests have been issued and the port is currently being serviced. For example, if the FIFO threshold for a Gigabit Ethernet port is set so that the receive ready flags are asserted when 64 bytes of data are in the MAC receive FIFO 206, then the state of the flags does not change until the next 64 bytes arrive 5120 ns later. If the ready bus sequencer 160 is programmed to collect the flags four times each 5120 ns period, the next three sets of ready flags that are to be collected by the ready bus sequence 160 can be ignored.

When the receive ready count is used to monitor the freshness of the receive ready flags, there is a possibility that the receive ready flags will be ignored when they are providing new status. For a more accurate determination of ready flag freshness, the receive request count may be used. Each time a receive request is completed and the receive control information is pushed onto the RCV_CNTL register 232, the RSM 166 increments the receive request count. The count is recorded in the RCV_RDY_CNT register the first time the ready bus sequencer executes an rxrdy instruction for each program loop. The receive scheduler thread 92 can use this count to track how many requests the receive state machine has completed. As the receive scheduler thread issues commands, it can maintain a list of the receive requests it submits and the ports associated with each such request.

Figure 8B:
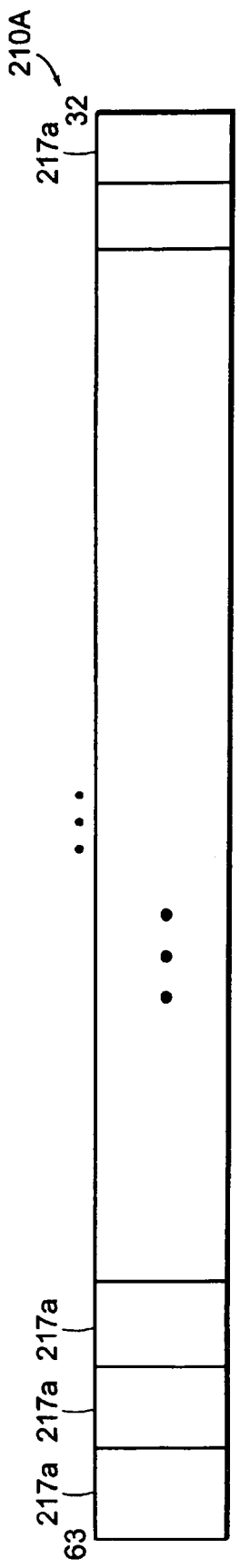
Figure 8C:
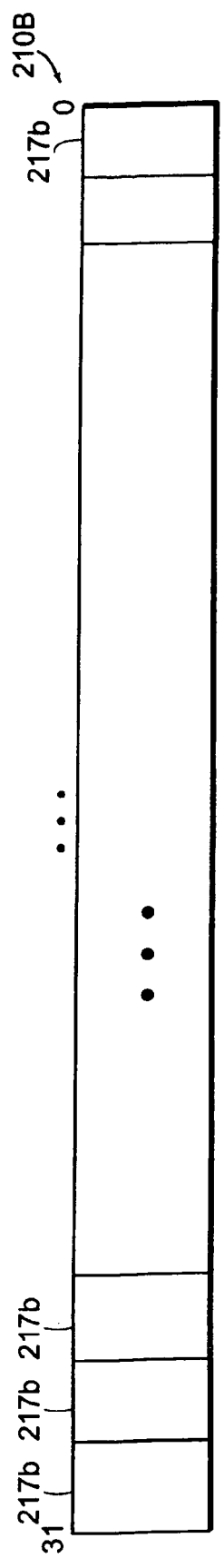

Referring to FIGS. 8B and 8C, the registers RCV_RDY_HI 210a and RCV_RDY_LO 210b have a flag bit 217a, 217b, respectively, corresponding to each port.

Figure 9:
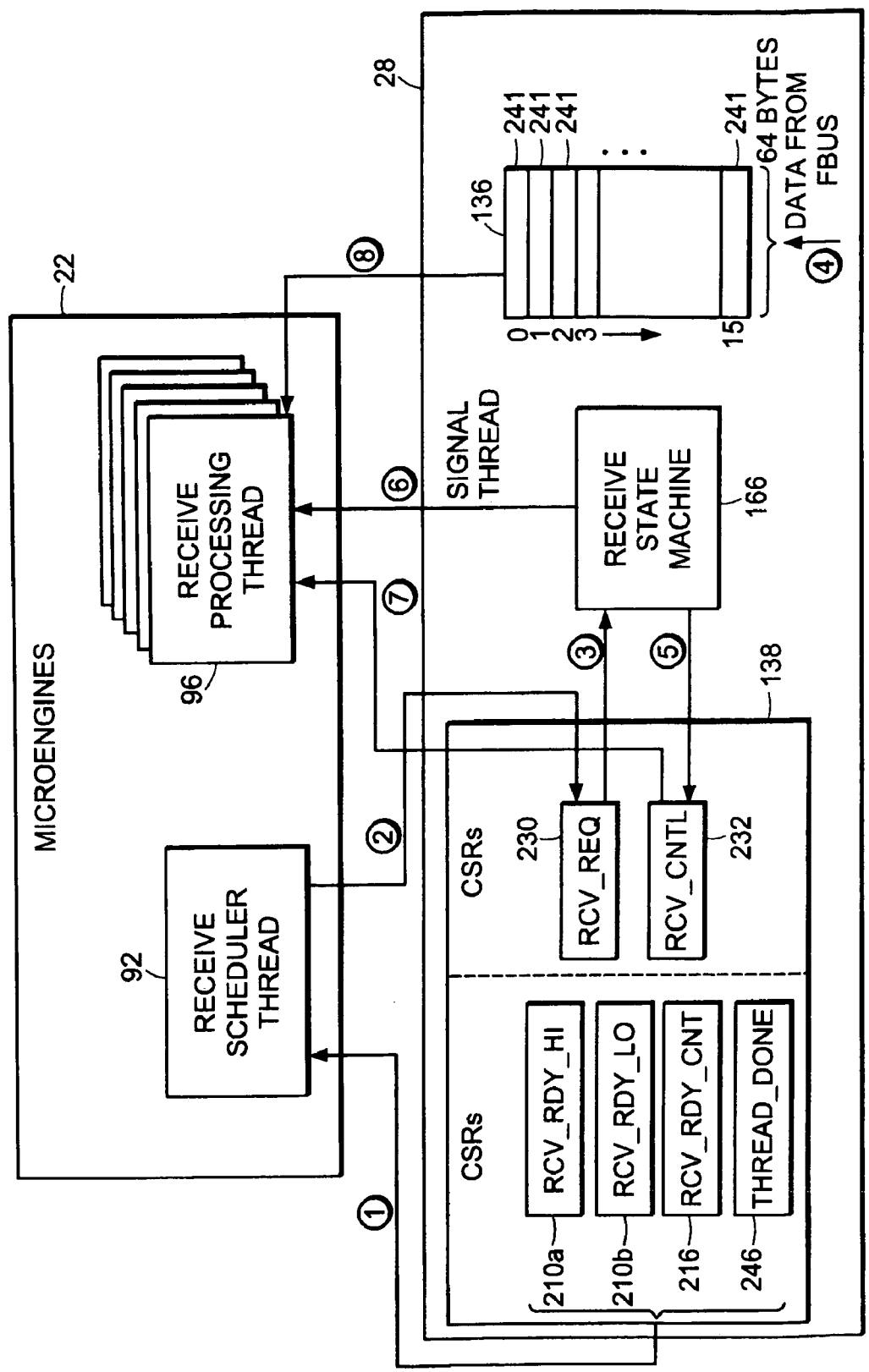
FIG. 9 is a depiction of the receive threads and their interaction with the I/O bus interface during a receive process.

Referring to FIG. 9, the receive scheduler thread 92 performs its tasks as quickly as possible to ensure that the RSM 166 is always busy, that is, that there is always a receive request waiting to be processed by the RSM 166. Several tasks performed by the receive scheduler 92 are as follows. The receive scheduler 92 determines which ports need to be serviced by reading the RCV_RDY_HI, RCV_RDY_LO and RCV_RDY_CNT registers 210a, 210b and 216, respectively. The receive scheduler 92 also determines which receive ready flags are new and which are old using either the receive request count or the receive ready count in the RCV_RDY_CNT register, as described above. It tracks the thread processing status of the other microengine threads by reading thread done status CSRs 240. The receive scheduler thread 92 initiates transfers across the Fbus 132 via the ready bus, while the receive state machine 166 performs the actual read transfer on the Fbus 132. The receive scheduler 92 interfaces to the receive state machine 166 through two FBI CSRs 138: an RCV_REQ register 230 and an RCV_CNTL register 232. The RCV_REQ register 230 instructs the receive state machine on how to receive data from the Fbus 132.

Still referring to FIG. 9, a process of initiating an Fbus receive transfer is shown. Having received ready status information from the RCV_RDY_HI/LO registers 210a, 210b as well as thread availability from the thread done register 240 (transaction "1", as indicated by the arrow labeled 1), the receive scheduler thread 92 determines if there is room in the RCV_REQ FIFO 230 for another receive request. If it determines that RCV_REQ FIFO 230 has room to receive a request, the receive scheduler thread 92 writes a receive request by pushing data into the RCV_REQ FIFO 230 (transaction 2). The RSM 166 processes the request in the RCV_REQ FIFO 230 (transaction 3). The RSM 166 responds to the request by moving the requested data into the RFIFO 136 (transaction 4), writing associated control information to the RCV_CTL FIFO 232 (transaction 5) and generating a start-receive signal event to the receive processing thread 96 specified in the receive request (transaction 6). The RFIFO 136 includes 16 elements 241, each element for storing a 64 byte segment of data referred to herein as a MAC packet ("MPKT"). The RSM 166 reads packets from the MAC ports in fragments equal in size to one or two RFIFO elements, that is, MPKTs. The specified receive processing thread 96 responds to the signal event by reading the control information from the RCV_CTL register 232 (transaction 7). It uses the control information to determine, among other pieces of information, where the data is located in the RFIFO 136. The receive processing thread 96 reads the data from the RFIFO 136 on quadword boundaries into its read transfer registers or moves the data directly into the SDRAM (transaction 8).

The RCV_REQ register 230 is used to initiate a receive transfer on the Fbus and is mapped to a two-entry FIFO that is written by the microengines. The I/O bus interface provides signals (not shown) to the receive scheduler thread indicating that the RCV_REQ FIFO 236 has room available for another receive request and that the last issued receive request has been stored in the RCV_REQ register 230.

Referring to FIG. 10A, the RCV_REQ FIFO 230 includes two entries 231. The format of each entry 231 is as follows. The first two bits correspond to a reserved field 230a. Bit 29 is an FA field 230b for specifying the maximum number of Fbus accesses to be performed for this request. A THSG field (bits 28:27) 230c is a two-bit thread message field that allows the scheduler thread to pass a message to the assigned receive thread through the ready state machine, which copies this message to the RCV_CNTL register. An SL field 230d (bit 26) is used in cases where status information is transferred following the EOP MPKT. It indicates whether two or one 32-bit bus accesses are required in a 32-bit Fbus configuration. An E1 field 230e (bits 21:18) and an E2 field (bits 25:22) 230f specify the RFIFO element to receive the transferred data. If only 1 MPKT is received, it is placed in the element indicated by the E1 field. If two MPKTs are received, then the second MPKT is placed in the RFIFO element indicated by the E2 field. An FS field (bits 17:16) 230g specifies use of a fast or slow port mode, that is, whether the request is directed to a fast or slow port. The fast port mode setting signifies to the RSM that a sequence number is to be associated with the request and that it will be handling speculative requests, which will be discussed in further detail later. An NFE field (bit 15) 230h specifies the number of RFEFO elements to be filled (i.e., one or two elements). The IGFR field (bit 13) 230i is used only if fast port mode is selected and indicates to the RSM that it should process the request regardless of the status of the fast ready flag pins. An SIGRS field (bit 11) 230j, if set, indicates that the receive scheduler be signaled upon completion of the receive request. A TID field (bits 10:6) 230k specifies the receive thread to be notified or signaled after the receive request is processed. Therefore, if bit 11 is set, the RCV_REQ entry must be read twice, once by the receive thread and once by the receive scheduler thread, before it can be removed from the RCV_REQ FIFO. An RM field (bits 5:3) 230l specified the ID of the MAC device that has been selected by the receive scheduler. Lastly, an RP field (bits 2:0) 230m specifies which port of the MAC device specified in the RM field 230l has been selected.

The RSM 166 reads the RCV_REQ register entry 231 to determine how it should receive data from the Fbus 132, that is, how the signaling should be performed on the Fbus, where the data should be placed in the RFIFO and which microengine thread should be signaled once the data is received. The RSM 166 looks for a valid receive request in the RCV_REQ FIFO 230. It selects the MAC device identified in the RM field and selects the specified port within the MAC by asserting the appropriate control signals. It then begins receiving data from the MAC device on the Fbus data lines. The receive state machine always attempts to read either eight or nine quadwords of data from the MAC device on the Fbus as specified in the receive request. If the MAC device asserts the EOP signal, the RSM 166 terminates the receive early (before eight or nine accesses are made). The RSM 166 calculates the total bytes received for each receive request and reports the value in the REC_CNTL register 232. If EOP is received, the RSM 166 determines the number of valid bytes in the last received data cycle.

The RCV_CNTL register 232 is mapped to a four-entry FIFO (referred to herein as RCV_CNTL_FIFO 232) that is written by the receive state machine and read by the microengine thread. The I/O bus interface 28 signals the assigned thread when a valid entry reaches the top of the RCV_CNTL FIFO. When a microengine thread reads the RCV_CNTL register, the data is popped off the FIFO. If the SIGRS field 230i is set in the RCV_REQ register 230, the receive scheduler thread 92 specified in the RCV_CNTL register 232 is signaled in addition to the thread specified in TID field 230k. In this case, the data in the RCV_CNTL register 232 is read twice before the receive request data is retired from the RCV_CTL FIFO 232 and the next thread is signaled. The receive state machine writes to the RCV_CTL register 232 as long as the FIFO is not full. If the RCV_CTL FIFO 232 is full, the receive state machine stalls and stops accepting any more receive requests.

Referring to FIG. 10B, the RCV_CNTL FIFO 232 provides instruction to the signaled thread (i.e., the thread specified in TID) to process the data. As indicated above, the RCV_CNTL FIFO includes 4 entries 233. The format of the RCV_CNTL FIFO entry 233 is as follows: a THMSG field (31:30) 23a includes the 2-bit message copied by the RSM from REC_REQ register[28:27]. A MACPORT/THD field (bits 29:24) 232b specifies either the MAC port number or a receive thread ID, as will be described in further detail below. An SOP SEQ field (23:20) 232c is used for fast ports and indicates a packet sequence number as an SOP (start-of-packet) sequence number if the SOP was asserted during the receive data transfer and indicates an MPKT sequence number if SOP was not so asserted. An RF field 232d and RERR field 232e (bits 19 and 18, respectively) both convey receive error information. An SE field 232f (17:14) and an FE field 232g (13:10) are copies of the E2 and E1 fields, respectively, of the REC_REQ. An EF field (bit 9) 232h specifies the number of RFIFO elements which were filled by the receive request. An SN field (bit 8) 232i is used for fast ports and indicates whether the sequence number specified in SOP_SEQ field 232c is associated with fast port 1 or fast port 2. A VLD BYTES field (7:2) 232j specifies the number of valid bytes in the RFIFO element if the element contains in EOP MPKT. An EOP field (bit 1) 232k indicates that the MPKT is an EOP MPKT. An SOP field (bit 0) 232l indicates that the MPKT is an SOP MPKT.

Figure 11:
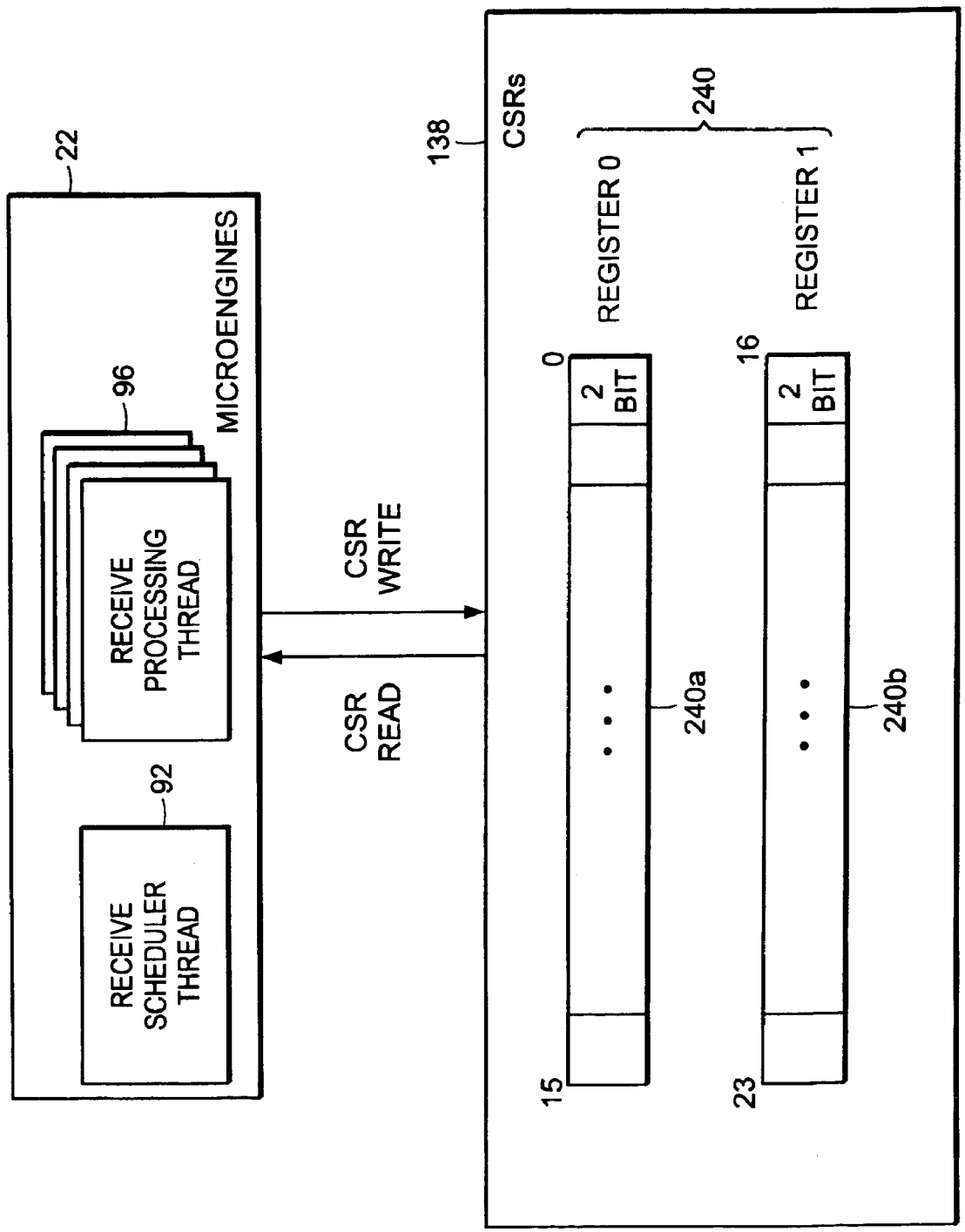
FIG. 11 is an illustration of the thread done registers.

FIG. 11 illustrates the format of the thread done registers 240 and their interaction with the receive scheduler and processing threads 92, 96, respectively, of the microengines 22. The thread done registers 240 include a first thread status register, TH_DONE_REG0 240a, which has 2-bit status fields 241a corresponding to each of threads 0 through 15. A second thread status register, TH_DONE_REG1 240b, has 2-bit status fields 241*b* corresponding to each of threads 16 through 23. These registers can be read and written to by the threads using a CSR instruction (or fast write instruction, described below). The receive scheduler thread can use these registers to determine which RFIFO elements are not in use. Since it is the receive scheduler thread 92 that assigns receive processing threads 96 to process the data in the RFIFO elements, and it also knows the thread processing status from the THREAD_DONE_REG0 and THREAD_DONE_REG1 registers 240*a*, 240*b*, it can determine which RFIFO elements are currently available.

The THREAD_DONE CSRs 240 support a two-bit message for each microengine thread. The assigned receive thread may write a two-bit message to this register to indicate that it has completed its task. Each time a message is written to the THREAD_DONE register, the current message is logically ORed with the new message. The bit values in the THREAD_DONE registers are cleared by writing a "1", so the scheduler may clear the messages by writing the data read back to the THREAD_DONE register. The definition of the 2-bit status field is determined in software. An example of four message types is illustrated in TABLE 1 below.

TABLE 1

| 2-BIT MESSAGE | DEFINITION |
| --- | --- |
| 00 | Busy. |
| 01 | Idle, processing complete. |
| 10 | Not busy, but waiting to finish processing of entire packet. |
| 11 | Idle, processing complete for an EOP MPKT. |

The assigned receive processing threads write their status to the THREAD_DONE register whenever the status changes. For example, a thread may immediately write 00 to the THREAD_DONE register after the receive state machine signals the assigned thread. When the receive scheduler thread reads the THREAD_DONE register, it can look at the returned value to determine the status of each thread and then update its thread/port assignment list.

The microengine supports a fast_wr instruction that improves performance when writing to a subset of CSR registers. The fast_wr instruction does not use the push or pull engines. Rather, it uses logic that services the instruction as soon as the write request is issued to the FBI CSR. The instruction thus eliminates the need for the pull engine to read data from a microengine transfer register when it processes the command. The meaning of the 10-bit immediate data for some of the CSRs is shown below.

TABLE 2

| CSR | 10-BIT IMMEDIATE DATA |
| --- | --- |
| INTER_THD_SIG | Thread number of the thread that is to be signaled. |
| THREAD_DONE | A 2-bit message that is shifted into a position relative to the thread that is writing the message. |
| THREAD_DONE_INCR1 | Same as THREAD_DONE except that |
| THREAD_DONE_INCR2 | either the enqueue_seq1 or enqueue_seq2 is also incremented. |
| INCR_ENQ_NUM1 | Write a one to increment the enqueue sequence number by one. |
| INCR_ENQ_NUM2 | |

It will be appreciated that the receive process as described herein assumes that no packet exemptions occurred, that is, that the threads are able to handle the packet processing without assistance from the core processor. Further, the receive process as described also assumes the availability of FIFO space. It will be appreciated that the various state machines must determine if there is room available in a FIFO, e.g., the RFIFO, prior to writing new entries to that FIFO. If a particular FIFO is full, the state machine will wait until the appropriate number of entries has been retired from that FIFO.

Round-Robin Receive of Network Data

In a multi-thread round robin scheme, there is no receive scheduler. Instead, a group of receive threads run in sequence, in a round-robin fashion, per given port or per group of ports. Each receive thread of the group passes off execution to a predetermined next receive thread. Execution continues to successively loop through all the receive threads of the group while maintaining the original ordering of the receive threads.

Figure 12:
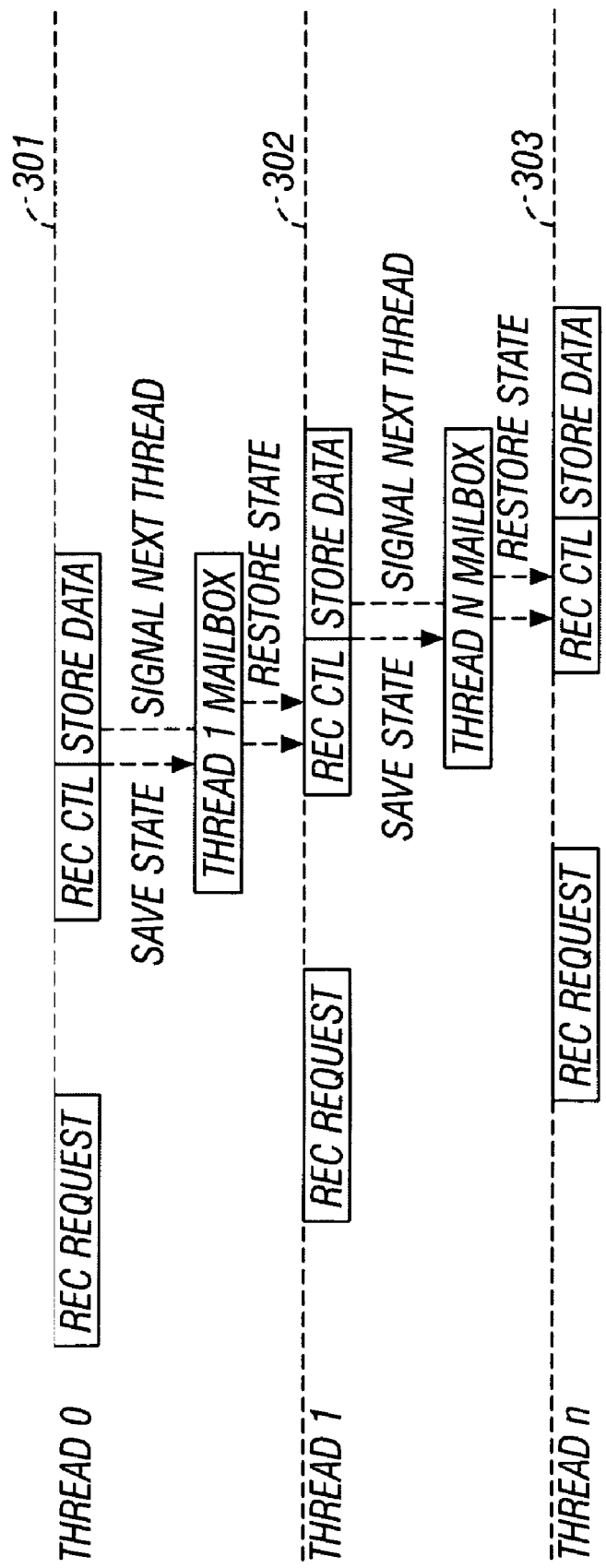
FIG. 12 shows a graphical overview of multiple receive threads processing network data.

FIG. 12 shows a graphical overview of multiple receive threads processing network data. The process will be described in more detail with respect to FIGS. 13 and 14. The network data is received over a bus interface that is connected to a MAC, each with one or more ports that are in turn connected to networks. The data is received as a series of section of packets, MPKTs. The receive threads are responsible for requesting that data be transferred from one of the ports to the RFIFO 136 inside the processor 12, then reading status of the transfer, reading the data from the RFIFO 136, analyzing the data, and copying the data to DRAM.

Referring to FIG. 12, a group of receive threads are shown processing network data. Thread 0 (301) executes first, then thread 1 (302), and then thread n (303). The process then loops back and repeats starting with thread 0. In one embodiment, the group consists of three receive threads, but more threads could be employed.

The receive threads save status information to the next receive thread via a mailbox stored at predetermined common fast memory or register locations, as will be described. Then the currently-executing receive thread signals the next receive thread to begin processing network data. The signal interlock insures that the threads execute in order (the state restores occur in order), while at the same time executing in parallel (data analysis is concurrent).

Figure 13:
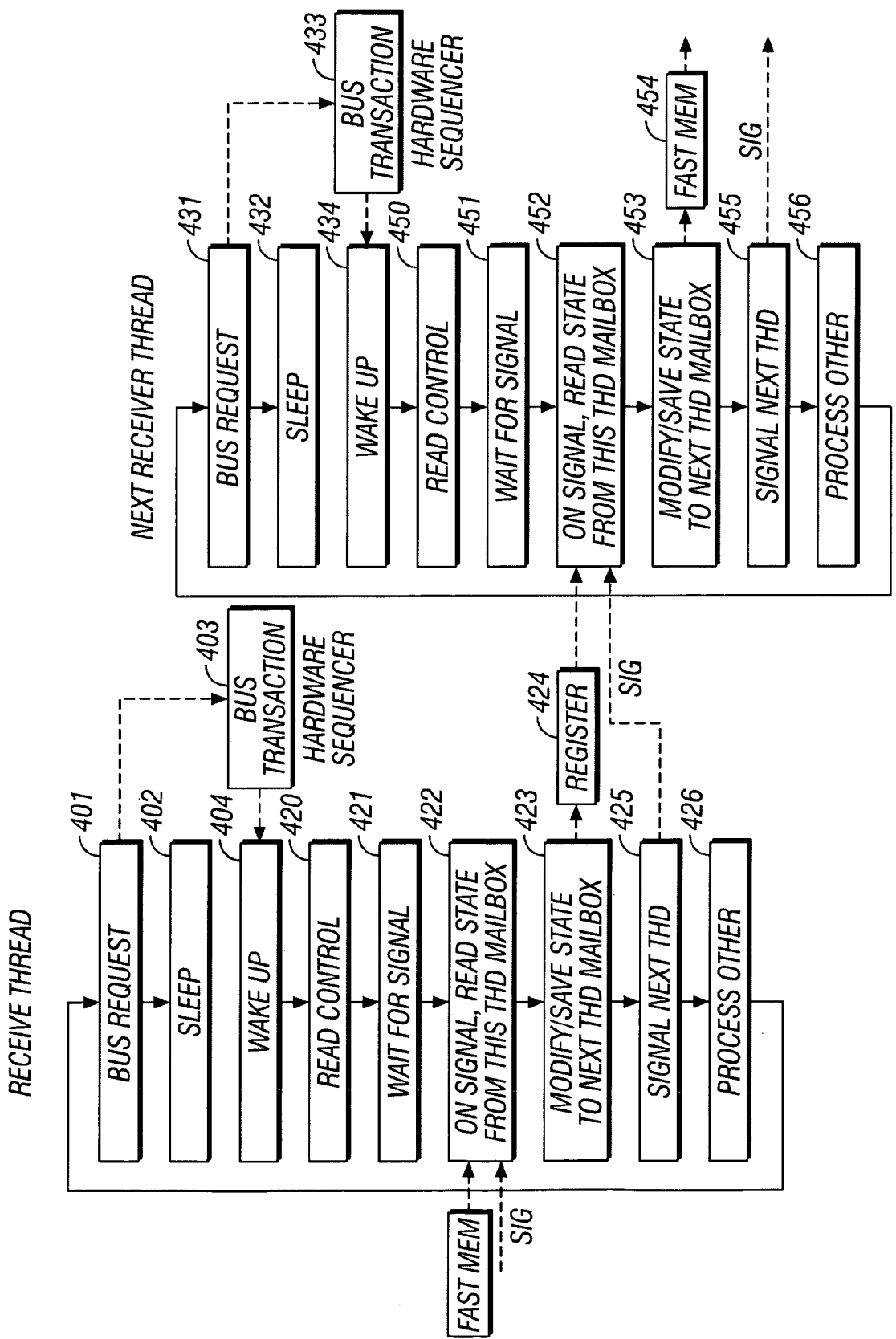
FIG. 13 shows a flowchart of the interaction between two receive threads.

FIG. 13 shows a flowchart of the interaction between two receive threads 96. The first receive thread requests a bus transaction (box 401) from the bus interface 124. The first receive thread then waits for the bus transaction to complete (box 402). The ready bus sequencer 160 completes the bus transaction (403) and the bus interface 124 wakes up the first receive thread (404).

The first receive thread, upon waking up, reads a control register (box 420) to obtain information about the bus transaction, i.e., which port, where in the receive FIFO the data is stored, size of data, type of port, message and other information. The receive thread then waits to be signaled (by the previous receive thread) (box 421). When the receive thread receives the signal (box 422), the receive thread reads status information from its mailbox. As shown in FIG. 13, the receive thread's mailbox is in fast memory, as will be described later.

The receive thread modifies the status information and saves state (status information) to the next receive thread's mailbox (box 423). In one embodiment, the next receive thread's mailbox is either in a common shared register or in fast memory, determined as follows: If the currently-executing receive thread and the next receive thread are in the same microengine, then the next receive thread's mailbox is in a common shared register. If the currently-executing receive thread and the next receive thread are in different microengines, then the next receive thread's mailbox is in common fast memory. As shown in FIG. 13, the receive thread stores state to a common register (box 424) (because the next receive thread is in the same microengine).

The receive thread signals the next receive thread to begin processing its data (box 425). In one embodiment, the next receive thread is signaled with the instruction fast_wr [n, inter_thd_sig], where n is the thread_id and inter_thd_sig identifies an interthread signal. This is a relatively fast operation because the data (which thread to signal) is contained in the command. The command is moved to the internal command interface, which then writes the INTER_THD_SIG register to assert the signal at the appropriate microengine/thread. The current receive thread is now free to continue to analyze and move data (box 426).

The next receive thread (box 431-456) behaves in a similar fashion to that just described with respect to box 401-426. However, as shown in FIG. 13, in box 453/454, the status information is saved to fast memory because the subsequent receive thread is in a different microengine.

In one embodiment, there is a 5 cycle latency between writing the status information by one thread and reading the status information by the next receive thread when the two receive threads are on the same microengine, and a 30 cycle latency when the receive threads cross microengine boundaries. This gives rise to an average latency of approximately 12 cycles (assuming a 3 intra-microengine threads-to-1 inter-microengine thread ratio), which is quicker than can be done using a receive scheduler.

Figure 14:
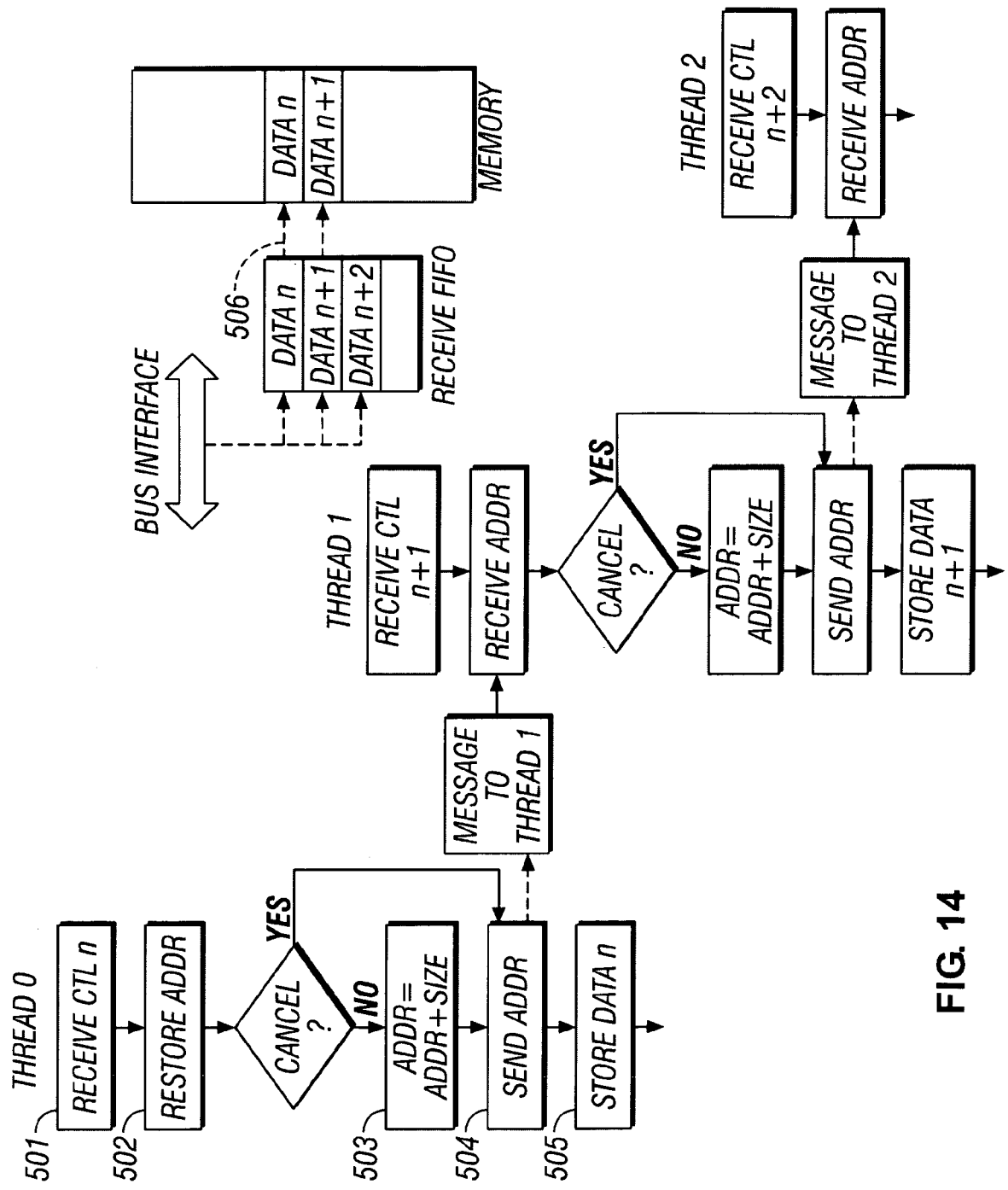
FIG. 14 illustrates one embodiment of the process in which the multiple threads receive data, increment DRAM addresses, and transfer the data to sequential buffers in DRAM.

FIG. 14 illustrates one embodiment of the process in which the multiple threads receive data, increment DRAM addresses, and transfer the data to sequential buffers in DRAM. As previously described, after waking up, the thread 0 reads a control register (501) that has port information, etc. The thread 0 then restores the packet address from its pre-designated mailbox (box 502). The packet address indicates the location for the packet data in memory.

In the receive control register, there may be a cancel message. If there is no cancel, then the receive thread increments the packet address by the buffer size of the data (box 503), and saves the updated address to the next receive thread's designated mailbox (box 504). After saving the updated address, the thread copies the data from RFIFO to DRAM (box 505/506).

If there is a cancel, then the receive thread does not increment the packet address, but merely saves the packet address unmodified in the next receive thread's mailbox. In this case, no data is copied to DRAM.

In one embodiment, the receive thread then writes a thread done register to indicate it is available for re-assignment. The sequence repeats for subsequent receive threads, with the subsequent receive threads making requests to the bus interface, restoring/saving state, signaling the next thread, and processing data.

In one embodiment, application software for programming the receive threads to operate in the network processor as described can be provided as instructions stored on floppy disk, CD-ROM, or other storage media. Alternatively, the application software can be downloaded via the Internet. The application software is then installed to a storage medium on the host system, such as a hard disk, random access memory, or non-volatile memory.

Thus, a method of processing network data in a network processor includes using multiple receive threads executing in a round robin fashion. This scheme allows the network processor to receive data the full line rate. However, the specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method of processing network data in a network processor comprising:

assigning multiple program threads associated with multiple microengines operatively coupled to the network processor, the multiple program threads including a currently executing thread and a next thread, to a media access controller port of a network device operatively coupled to the network processor, a program thread having an associated program counter;

processing network data received from the media access controller port using the multiple program threads in a round-robin fashion, wherein the multiple program threads form a sequence, to enable network data transfer to a port of a forwarding device, wherein the processing comprises successively passing status information of the processing from a currently executing thread to a next thread via a mailbox, wherein the next thread follows the currently executing thread in the sequence, wherein the status information of a thread is stored in a mailbox corresponding to the thread, wherein the status information includes a packet address indicative of a storage location for the network data received from the media access controller port, and wherein the mailbox is a first mailbox; and storing second status information of the next thread in a second mailbox of a subsequent next thread of the sequence of the multiple program threads, wherein number of the multiple program threads is predetermined.

2. The method of claim 1, wherein the mailbox is a shared general purpose register, when the currently executing thread and the next thread are associated with a common microengine.

3. The method of claim 1, wherein the mailbox is a shared memory, when the currently executing thread and the next thread are associated with different microengines.

4. The method of claim 1 wherein the mailbox is a first mailbox, the method further comprising:

signaling the next thread to read the status information from a second mailbox corresponding to the next thread.

5. The method of claim 1, wherein the successively passing status information is performed without processing the network data when there is no network data available from the port.

6. The method of claim 1, wherein the multiple program threads comprise receive threads.

7. A method of processing a data packet received from a media access controller port of a network device operatively coupled to a network processor, to enable data packet transfer to a port of a forwarding device, the method comprising:

assigning a predetermined number of threads, associated with a predetermined number of microengines operatively coupled to the network processor, to the media access controller port to process the data packet, the predetermined number of threads to be employed in a round-robin fashion, wherein the predetermined number of threads form a sequence, each of the predetermined number of threads having an associated program counter;

processing a first portion of the data packet by a first thread of the sequence of the predetermined number of threads;

storing status information of the first thread in a mailbox of a next thread in the sequence of the predetermined number of threads;

signaling the next thread to begin processing a second portion of the data packet based on the status information stored in the mailbox of the next thread, wherein the status information includes a packet address indicative of a storage location for the network data received from the media access controller port, and wherein the mailbox is a first mailbox; and storing second status information of the next thread in a second mailbox of a subsequent next thread in the sequence of the predetermined number of threads.

8. The method of claim 7 further comprising: processing the second portion of the data packet by the next thread when data is available from the port.

9. The method of claim 7 further comprising: signaling the next thread to begin processing the second portion of the data packet when no data is available from the port.

10. An article comprising a computer-readable medium which stores computer-executable instructions for processing data in a network processor, to enable network data transfer to a port of a forwarding device, the instructions causing a computer to:

assign a first set of multiple program threads associated with multiple microengines operatively coupled to the network processor, to a first one of multiple media access controller ports of a network device operatively coupled to the network processor, a program thread in the first set of multiple program threads having associated program counter data;

process successive portions of a single packet received from the first one of the media access controller ports by multiple, respective, successive threads of the first set of multiple program threads, wherein instructions to process comprise instructions to pass status information of the successive portions of the single packet from one thread in the first set of multiple program threads to a next thread in the first set of multiple program threads by storing the status information to a storage area of the next thread, wherein the status information includes a packet address indicative of a storage location for the network data received from the media access controller port, and wherein the mailbox is a first mailbox; and storing second status information of the next thread in a second mailbox of a subsequent next thread of the multiple program threads, wherein number of the multiple program threads is predetermined.

11. The article of claim 10, wherein the status information includes a single packet data address.

12. The article of claim 10, wherein the first set of multiple program threads comprise receive threads.

13. The article of claim 10, wherein a one of the first set of multiple program threads writes a respective successive portion of the single packet to a portion of memory contiguous with a preceding portion of the single packet written to the memory by a preceding thread of the first set of multiple program threads.

14. The article of claim 10, wherein individual ones of the threads in the first set of multiple program threads store an indication of an address of memory to write a portion of the single packet for retrieval by a succeeding thread in the first set of multiple program threads.

15. The article of claim 10, wherein the first set of multiple program threads operate on successive portions of the single packet in accordance with a repeating sequence of the first set of multiple program threads.

16. The article of claim 10, further comprising instructions to assign a second set of multiple program threads to a second one of the multiple media access controller ports, the second set of threads processing data received from the second one of the media access controller ports concurrent with the first set of multiple program threads processing data from the first one of the media access controller ports.

* * * * *